United States Patent
Jackson

(10) Patent No.: US 9,934,039 B2
(45) Date of Patent: Apr. 3, 2018

(54) STACK SAVED VARIABLE POINTER VALUE PREDICTION

(71) Applicant: Imagination Technologies Limited, Kings Langley (GB)

(72) Inventor: Hugh Jackson, Sydney (AU)

(73) Assignee: MIPS Tech Limited, Kings Langley (GB)

(*) Notice: Subject to any disclaimer, the term of this patent is extended or adjusted under 35 U.S.C. 154(b) by 284 days.

(21) Appl. No.: 14/598,415

(22) Filed: Jan. 16, 2015

(65) Prior Publication Data

US 2015/0205612 A1    Jul. 23, 2015

(30) Foreign Application Priority Data

Jan. 17, 2014 (GB) .................... 1400810.6

(51) Int. Cl.
*G06F 9/30* (2018.01)
*G06F 9/38* (2018.01)
*G06F 9/44* (2018.01)

(52) U.S. Cl.
CPC ...... *G06F 9/30181* (2013.01); *G06F 9/30043* (2013.01); *G06F 9/30098* (2013.01); *G06F 9/30134* (2013.01); *G06F 9/30138* (2013.01); *G06F 9/384* (2013.01); *G06F 9/3832* (2013.01); *G06F 9/4425* (2013.01)

(58) Field of Classification Search
None
See application file for complete search history.

(56) References Cited

U.S. PATENT DOCUMENTS

| 5,901,316 | A | 5/1999 | Goebel |
| 7,263,600 | B2 * | 8/2007 | Sander .................. G06F 9/3826 712/218 |
| 2003/0161172 | A1 | 8/2003 | Civlin |
| 2005/0102494 | A1 | 5/2005 | Grochowski et al. |
| 2011/0055526 | A1 | 3/2011 | Kwon et al. |

FOREIGN PATENT DOCUMENTS

WO    WO-02/45385 A2    6/2002

* cited by examiner

*Primary Examiner* — Corey S Faherty
(74) *Attorney, Agent, or Firm* — Vorys, Sater, Seymour and Pease LLP; Vincent M DeLuca

(57) ABSTRACT

Methods of predicting stack pointer values of variables stored in a stack are described. When an instruction is seen which stores a variable in the stack in a position offset from the stack pointer, an entry is added to a data structure which identifies the physical register which currently stores the stack pointer, the physical register which stores the value of the variable and the offset value. Subsequently when an instruction to load a variable from the stack from a position which is identified by reference to the stack pointer is seen, the data structure is searched to see if there is a corresponding entry which includes the same offset and the same physical register storing the stack pointer as the load instruction. If a corresponding entry is found the architectural register in the load instruction is mapped to the physical register storing the value of the variable from the entry.

20 Claims, 15 Drawing Sheets

STACK SAVED VARIABLE POINTER VALUE PREDICTION

BACKGROUND

Out-of-order microprocessors can provide improved computational performance by executing instructions in a sequence that is different from the order in the program, so that instructions are executed when their input data is available rather than waiting for the preceding instruction in the program to execute. In order to allow instructions to run out-of-order on a microprocessor it is useful to be able to rename registers used by the instructions. This enables the removal of "write-after-read" (WAR) dependencies from the instructions as these are not true dependencies. By using register renaming and removing these dependencies, more instructions can be executed out of program sequence, and performance is further improved. Register renaming is performed by maintaining a map of which registers named in the instructions (called architectural registers) are mapped onto the physical registers of the microprocessor. This map may be referred to as a "register renaming map."

Due to there being a limited number of architectural registers, compilers cannot always keep all the program variables in registers and as a result some variables, which were stored in registers, may need to be saved to memory (usually to the program stack) to free up architectural registers. When the values of the variables are subsequently required, the values must be read back from the memory (e.g. the stack) into a register again. This reading from memory introduces a delay.

There are many situations where this problem of insufficient architectural registers may occur. For example, this problem may occur where there are more variables than architectural registers within a function (resulting in register spill) and/or when one function (the parent function) calls another function (the child function) and there are insufficient architectural registers for both the parent and child functions. Although one solution would be to increase the number of available architectural registers, this is typically not possible as it would change the size of the instruction set.

The embodiments described below are not limited to implementations which solve any or all of the disadvantages of known methods of operating a processor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of predicting pointer values of variables stored in a stack are described. When an instruction is seen which stores a variable in the stack in a position offset from the stack pointer, an entry is added to a data structure which identifies the physical register which currently stores the stack pointer, the physical register which stores the value of the variable and the offset value. Subsequently when an instruction to load a variable from the stack from a position which is identified by reference to the stack pointer is seen, the data structure is searched to see if there is a corresponding entry which includes the same offset and the same physical register storing the stack pointer as the load instruction. If a corresponding entry is found the architectural register in the load instruction is mapped to the physical register storing the value of the variable from the entry.

A first aspect provides a method of predicting pointer values of variables stored in a stack in a processor, the stack having a stack pointer and the method comprising: in response to detection of an instruction storing a variable to the stack with reference to the stack pointer, storing, in a data structure, a data entry comprising a unique ID for the stack pointer, a parameter representing a value of the variable before it was stored to the stack and an offset to the stack pointer at which the variable is stored; in response to subsequent detection of an instruction loading a variable from the stack with reference to the stack pointer, searching the data structure for an entry corresponding to the detected instruction; and in response to finding a corresponding entry in the data structure, updating an effective value of an architectural register referenced in the detected instruction using information stored in the corresponding entry.

A second aspect provides an apparatus comprising: hardware logic arranged to predict pointer values of variables stored in a stack in a processor, the stack having a stack pointer; and memory arranged to store a stack saved variable store, wherein the hardware logic is arranged: in response to detection of an instruction storing a variable to the stack with reference to the stack pointer, to store, in the stack saved variable store, a data entry comprising a unique ID for the stack pointer, a parameter representing a value of the variable before it was stored to the stack and an offset to the stack pointer at which the variable is stored; in response to subsequent detection of an instruction loading a variable from the stack with reference to the stack pointer, to search the stack saved variable store for an entry corresponding to the detected instruction; and in response to finding a corresponding entry in the stack saved variable store, to update an effective value of an architectural register referenced in the detected instruction using information stored in the corresponding entry in the stack saved variable store.

A third aspect provides a computer readable storage medium having encoded thereon computer readable program code for generating a processor comprising the apparatus as described herein.

A fourth aspect provides a computer readable storage medium having encoded thereon computer readable program code for generating a processor configured to perform a method as described herein.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
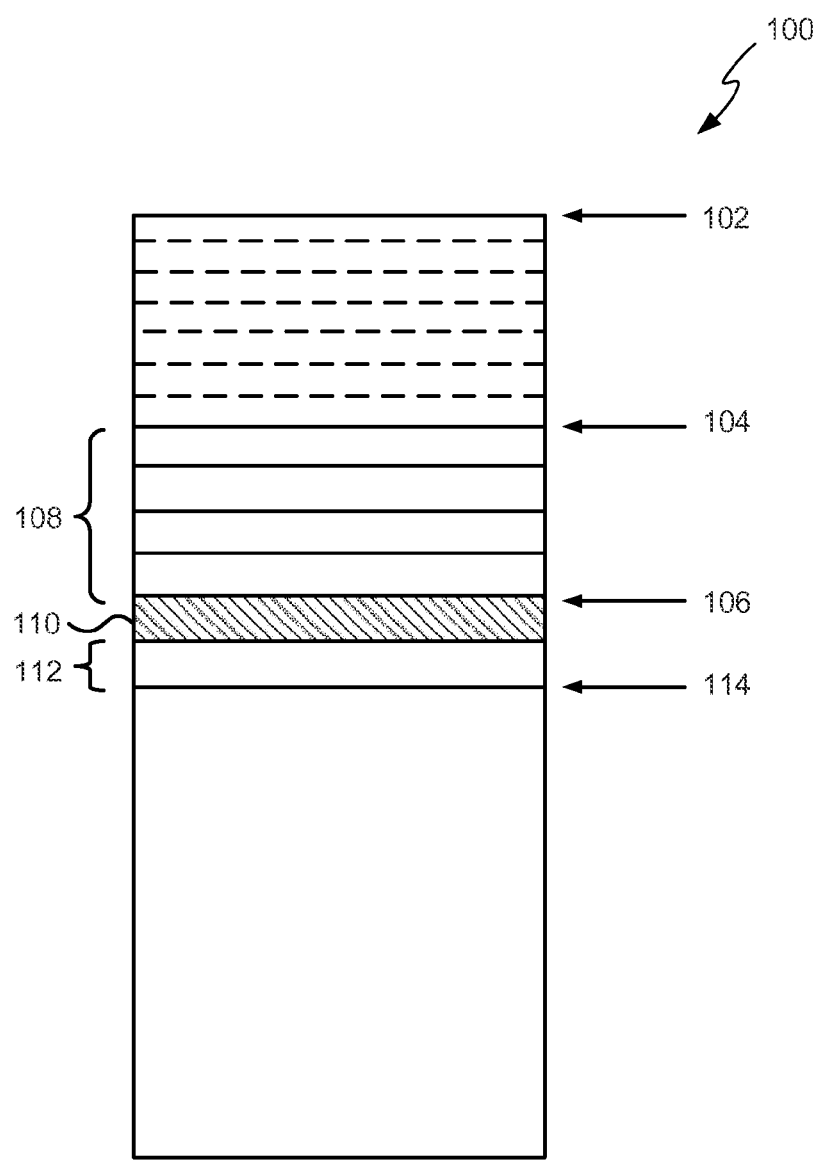
FIG. 1 is a schematic diagram of a stack.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, there are a limited number of architectural registers in a processor and so some variables, which were stored in registers, may need to be saved to the stack to free up architectural registers.

The stack is a data structure which is typically used to provide a region of temporary storage for use by a program and is implemented as a last-in first-out (LIFO) data structure (which may alternatively be referred to as a first-in last-out FILO data structure) such that data is removed from the stack strictly in the reverse order to which it was added to the stack. The stack may be considered to grow up or down from a stack origin; however, in either case, the top of the stack, which is the most recently added element on the stack, is identified by a stack pointer which typically points to the next non-used entry. The value of the stack pointer may be stored in a hardware register within a processor. When a data element is added (or "pushed") to the stack it is written to the location pointed to by the stack pointer and the value of the stack pointer is updated (so that it points to the next non-used entry), e.g. by incrementing the pointer by 4 (i.e. 4 bytes=32 bits. When a data element is subsequently removed (or "popped") from the stack, the data element is removed and the stack pointer is updated to point to the next non-used entry on the shorter stack.

For the purposes of the following description and as shown in FIG. 1, a stack 100 (with a stack origin indicated by arrow 102) is considered to grow down such that the value of the stack pointer decreases when data is pushed to the stack (e.g. when the stack pointer moves from the position marked by arrow 104 to the position marked by the arrow 106 when data 108 is added) and increases when data is popped from the stack (e.g. when the stack pointer moves from the position marked by arrow 106 to the position marked by the arrow 104 when data 108 is removed). It will be appreciated, however, that the methods described herein are equally applicable if a stack is considered to grow up (e.g. where the value of the stack pointer increases when data is pushed to the stack and decreases when data is popped from the stack).

Where variables used by a program are stored in the stack 100 (e.g. as there are insufficient architectural registers), these variables are stored in a position (e.g. the shaded position 110 in FIG. 1) which may be referenced by an offset 112 from the current stack pointer position (as indicated by arrow 114). Alternatively, where there is dynamic stack growth in the function, the position may be referenced by an offset from the frame pointer instead of the stack pointer. When the variables stored in the stack are subsequently read back into a register so that they can be used, this may introduce a significant latency.

Methods of predicting the value of a stack saved variable are described below. By predicting the value, rather than reading it from memory, the latency associated with reading the value from the stack is eliminated. In the methods described below, when a variable is stored to the stack in order to free up an architectural register, a data entry is stored in a data structure which records the physical register that the value of the variable was stored in (prior to it being stored into the stack), along with details of where the variable is stored in the stack. Subsequently, when there is an instruction to load the variable from the stack, the previously stored data entry can be used to identify which physical register contains the value of the variable and the new architectural register can be mapped to that physical register. In some examples the load from memory is not performed, whilst in other examples, the load from memory may still be performed but the predicted value is used to enable dependent instructions to execute in parallel with the load and the load is used only to check that the predicted value (i.e. the value stored in the physical register identified in the data structure and to which the new architectural register is mapped) is correct. Further methods are also described which enable the method to work after a function call and/or where register renaming is not used.

Figure 2:
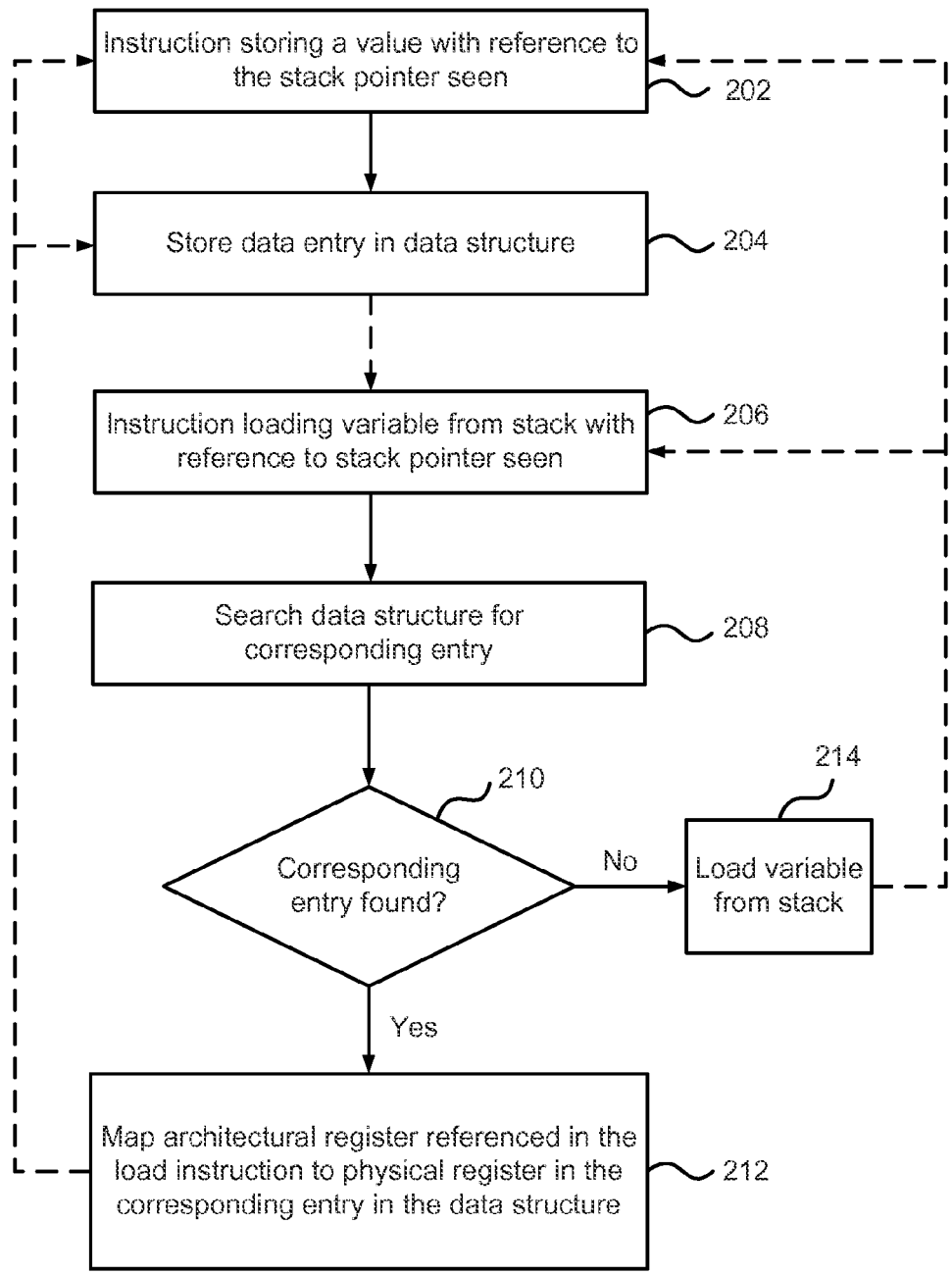
FIG. 2 shows a flow diagram of an example method of predicting the value of variables saved to the stack.

FIG. 2 shows a flow diagram of an example method of predicting the value of variables saved to the stack. As shown in FIG. 2 when an instruction is seen which stores a value (which may also be referred to as a variable in higher level constructs) with reference to the stack pointer (block 202), a data entry corresponding to the store instruction is stored in a new data structure which may be referred to herein as the 'stack saved value store' (block 204). The instruction may, for example, be detected (in block 202) by inspecting the instruction to look for an instruction which, before renaming, has the form:

ST Reg, [SP+#offset]

(where Reg could be any architectural register, #offset is a literal value and SP refers to the architectural stack pointer) and in some examples PC (program counter) based confidence tables may also be used. Each data entry comprises three elements: the register ID of the physical register storing the current stack pointer value ($P_{SP}$), the register ID of the physical register storing the value of the variable before it was stored to the stack (P) and the offset to the current stack pointer at which the variable is stored (O). In some examples, all three elements ($P_{SP}$, P and O) are included in full within a data entry. In other examples, although all three elements are represented within the data entry, they may not be included in full; however this may result in an increased number of incorrect predictions. For example, instead of including $P_{SP}$ in full, a subset of the bits of $P_{SP}$ may be included and similarly instead of including O in full, a subset of the bits of O may be included. In other examples, a combination of bits from $P_{SP}$ and O may be used (instead of $P_{SP}$ and O in full), e.g. a 'hash' of $P_{SP}$ and O, such as the result of combining the bits of $P_{SP}$ with the bits of O using an XOR logic function.

As described above, where there is dynamic stack growth in the function, the position maybe referenced by an offset from the frame pointer instead of the stack pointer and in which case, instead of storing the register ID of the physical register storing the current stack pointer value ($P_{SP}$), the register ID of the physical register storing the current frame point value is stored in place ($P_{FP}$). The offset, O, which is stored is then the offset to the current frame pointer at which the variable is stored. The look-up process remains unchanged irrespective of whether $P_{SP}$ or $P_{FP}$ is stored as the table stores physical register IDs in both cases. For the purposes of clarity the following description refers to storing $P_{SP}$, but it will be appreciated that the description also applies to situations where $P_{FP}$ is stored.

There may be many data entries in the stack saved value store and the store may be arranged to store the data in any suitable way and the examples described below provide just a few examples. In an example, each data entry may comprise a 5-bit register ID for the stack pointer, a 5-bit entry for the register ID holding the variable prior to it being stored into the stack and an offset which may, for example, be 16-bits in size if the full range of possible offsets within the stack are accommodated. However, as the actual offset is likely to be much smaller in size, the size of the offsets stored in the stack saved variable store may be limited in size to, for example, 5-bits.

Where the size of the offset which can be stored in the stack saved variable store is limited (e.g. to a 5-bit entry), there are a number of different mechanisms which may be used to address the unlikely event that the actual offset is larger than can be stored in the available entry. In a first example, an entry is not stored such that the value of the variable cannot subsequently be predicted and instead must be read from the stack. In a second example, only the bottom (i.e. least significant) bits are stored. This may result in an incorrect prediction if the 5 bits which are stored match another entry in the stack saved value store. In a third example, the offset value stored may not be the actual offset, but a hash of the offset value which creates a 5 bit value (which reduces the risk of a match between two entries in the stack saved value store).

In an example, the following instruction which stores a value with reference to a stack pointer may be identified (in block 202):

ST R2 8[SP]

where R2 is the architectural register which is to be stored into the stack and this is to be stored at an offset of 8 from the stack pointer (SP). This may be translated (using the register renaming map) by the decode and rename stage in a processor to:

ST P8 8[P4]

given that in this example, the architectural register R2 is currently mapped to physical register P8 and the current stack pointer is stored in physical register P4. This results in an entry in the stack saved variable store comprising the three elements: P4, P8 and 8 (block 204).

In an example, the stack saved value store may be in the form of a table:

| P4 | P8 | 8 |
|----|----|----|
|    |    |   |
|    |    |   | where the first column stores the register ID corresponding to the stack pointer ($P_{SP}$), the second column stores the register ID to which the architectural register is mapped prior to it being written to the stack (P) and the third column stores the offset value (O).

Where there is a finite amount of space in the stack saved variable store, data entries may be removed to make space for new data entries and this may, for example, be based on a least recently used (LRU) algorithm which evicts a least recently used data entry to make space for a new data entry when the stack saved variable store becomes full or any other replacement algorithm. In addition, or instead, entries may be removed from the stack saved variable store when the program returns from a function. In such an example, all entries from a function are cleared from the stack saved variable store when the program returns from that function and a determination of which entries in the stack saved variable store should be cleared may be based on the stack pointer. This is because all entries from a function will have the same stack pointer value unless dynamic memory allocation is used. Where dynamic memory allocation is used, $P_{FP}$ is stored rather than $P_{SP}$ and so the same eviction method may be used (which will as a result clear all entries with the same $P_{FP}$).

In some examples, the method may check for duplication, i.e. a store to the same location as an existing entry in the stack saved variable store (i.e. the same values of both $P_{SP}$ and O). Where an instruction is seen which relates to a store to the same location as an existing entry, that existing entry in the stack saved variable store may be overwritten with the new entry. If the method does not check for duplication, the amount of logic required to implement the method is reduced, but at the expense of reduced prediction correctness.

When subsequently an instruction loading a variable from the stack to an architectural register is seen (block 206), the stack saved variable store is searched (block 208) to see if there is an entry which corresponds to the load instruction (seen in block 206), i.e. an entry which comprises the same offset from the same stack pointer (i.e. the same physical register ID where the stack pointer value is stored). The instruction may, for example, be detected (in block 206) by inspecting the instruction to look for an instruction which, before renaming, has the form:

LD Reg, [SP+#offset]

There are many different ways that the search (in block 208) can be performed and this will depend, at least in part, on the structure of the stack saved variable store. Various structures and their impact on the search operation are described in more detail below.

In an example, the stack saved variable store may comprise the following entries:

| P2 | P3 | 6 |
|----|----|---|
| P4 | P8 | 8 |
| P6 | P7 | 2 | where, as described above, the first column stores the register ID corresponding to the stack pointer ($P_{SP}$), the second column stores the register ID to which the architectural register is mapped prior to it being written to the stack (P) and the third column stores the offset value (O).

If a load instruction was seen (in block 206) of the form:

LD R3 [SP+#8]

where R3 is the architectural register to which the value loaded from the stack is to be stored (which was previously referred to as the 'new architectural register' to differentiate it from the original architectural register associated with the variable before it was stored in the stack), this may be translated (using the register renaming map) to:

LD P10 [P4+#8]

as architectural register R3 is currently mapped to physical register P10 and the stack pointer value is currently stored in physical register P4 (which may also be described as the stack pointer currently being mapped to P4).

The search (in block 208) therefore looks for a corresponding entry which comprises an offset of 8 and a stack pointer of P8. In this example, the second entry in the stack saved variable store matches these criteria and so a corresponding entry is found in the stack saved variable store ('Yes' in block 210).

In response to finding a corresponding entry in the stack saved variable store ('Yes' in block 210), the method could proceed by moving the saved variable value currently stored in the identified register in the corresponding entry (e.g. P8 in the example above) to the physical register to which the architectural register (identified in the load instruction) is mapped (e.g. P10 in the example above). However, this move does not need to be performed and instead register renaming may occur to map the architectural register identified in the load instruction to the physical register identified in the corresponding entry (block 212), i.e. the register renaming map may be updated directly with the physical register identified in the corresponding entry. So, in the example above, instead of moving the value from physical register P8 to physical register P10, the register renaming map is updated such that architectural register R3 is mapped to P8 instead of P10 (in block 212).

In this example the load instruction is never performed; however in other examples the load from the stack may still be performed, as described below. In either situation, the value of the variable is available for use by another instruction (e.g. a dependent instruction) without any latency associated with waiting for the variable to be loaded from the stack into a register.

If the search (in block 208) did not result in finding a corresponding entry in the stack saved variable store ('No' in block 210), the variable is loaded from the stack into the identified physical register (i.e. the one currently mapped to the architectural register identified in the load instruction) in the standard way (block 214).

Figure 3:
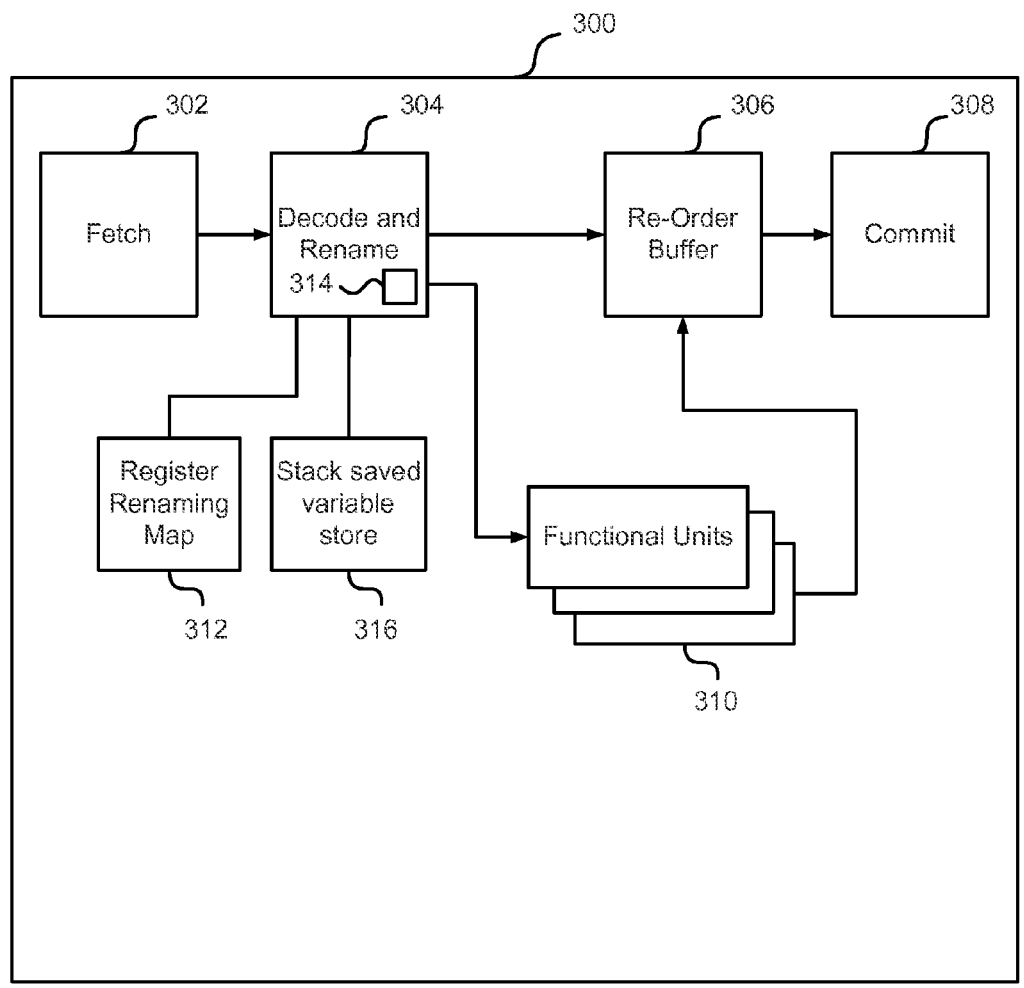
FIG. 3 shows a schematic diagram of an example processor in which the methods described herein may be implemented.

FIG. 3 shows a schematic diagram of an example out-of order processor 300 in which the methods described herein may be implemented. In this example the processor 300 is a single-threaded processor; however the methods are also applicable to multi-threaded processors (where each thread would maintain a separate stack using separate stack pointers).

The processor 300 comprises a fetch stage 302, a decode and rename stage 304, a re-order buffer 306, a commit stage 308 and one or more functional units 310 which each comprise one or more execution pipelines. The processor 300 further comprises a register renaming map (or register renaming table) 312 which is maintained by the decode and rename stage 304 (or by a register renaming module within the decode and rename stage 304).

The fetch stage 302 is configured to fetch instructions from a program (in program order) as indicated by a program counter (PC). Once an instruction is fetched it is provided to the decode and rename stage 304 which is arranged to interpret the instructions and perform register renaming. In particular, each instruction may comprise a register write operation; one or more register read operations; and/or an arithmetic or logical operation. A register write operation writes to a destination register and a register read operation reads from a source register. During register renaming each architectural register referred to in an instruction (e.g. each source and destination register) is replaced (or renamed) with a physical register.

For register write operations the architectural register (e.g. destination register) referred to is allocated an unused (or available) physical register. Any allocation may be stored in the register renaming map 312, where the register renaming map 312 is a data structure showing the mapping between each architectural register and the physical register allocated to that instruction in the program flow. For register read operations the correct physical register for a particular architectural register (e.g. source register) can be determined from an entry in the register renaming map 312 indexed by the architectural register.

The methods described above with reference to FIG. 2 may be implemented within the decode and rename stage 304 and in an example, the decode and rename stage 304 may comprise a stack saved variable prediction module 314 which performs the method shown in FIG. 2 and described above. As described above, this module 314 (or the decode and rename stage 304) maintains a data structure referred to herein as the stack saved variable store 316.

After an instruction passes through the decode and rename stage 304 it is inserted into a re-order buffer 306 (ROB) and dispatched to a functional unit 310 for execution. The functional unit 310 that the instruction is dispatched to may be based on the type of instruction. The re-order buffer 306 is a buffer that enables the instructions to be executed out-of-order, but committed in-order. The re-order buffer 306 holds the instructions that are inserted into it in program order, but the instructions within the ROB 306 can be executed out of sequence by the functional units 310. In some examples, the re-order buffer 306 can be formed as a circular buffer having a head pointing to the oldest instruction in the ROB 306, and a tail pointing to the youngest instruction in the ROB 306. Instructions are output from the re-order buffer 306 to the commit stage 308 in program order. In other words, an instruction is output from the head of the ROB 306 when that instruction has been executed, and the head is incremented to the next instruction in the ROB 306. Instructions output from the re-order buffer 306 are provided to a commit stage 308, which commits the results of the instructions to the register/memory.

Each functional unit 310 is responsible for executing instructions and may be configured to execute specific types of instructions. For example the functional units 310 may comprise one or more of a load-store unit, an integer unit, a floating point unit (FPU), a digital signal processing (DSP)/single instruction multiple data (SIMD) unit, or a multiply accumulate (MAC) unit. An integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The pipelines within the functional units may have different lengths and/or complexities. For example, a FPU pipeline is typically longer than an integer execution pipeline because it is generally performing more complicated operations.

The processor 300 may also comprise functional elements other than those shown in FIG. 3 (e.g. it may comprise a register file cache (RFC) and a register file (RF)). The processor may further comprise a branch predictor which is configured to predict which direction the program flow will take in the case of instructions known to cause possible flow changes, such as branch instructions. Branch prediction is useful as it enables instructions to be speculatively executed by the processor 400 before the outcome of the branch instruction is known. When the branch predictor predicts the program flow accurately, this improves performance of the processor 300. However, if the branch predictor does not correctly predict the branch direction, then a mis-prediction occurs which needs to be corrected before the program can continue. To correct a mis-prediction, the speculative instructions sent to the ROB 406 are abandoned, and the fetch stage 302 starts fetching instructions from the correct program branch.

It will be appreciated that other processors may not comprise all the functional elements shown in FIG. 3 (i.e. one or more of the functional elements shown in FIG. 3 may be omitted) and may, in some examples, comprise additional functional elements not shown in FIG. 3.

As shown in FIG. 3, the stack saved variable store 316 is maintained by the decode and rename stage 304 separate from and in parallel to maintaining the register renaming map 312. Alternatively, the two may be combined in a single data structure where one part (which corresponds to the register renaming map 312) is indexed by the architectural register and the other part (which corresponds to the stack saved variable store 316) is indexed by $P_{SP}$ and O, but the two parts are still updated independently. The decode and rename stage 304 may comprise a stack saved variable prediction module 314 which is arranged to store the values in the stack saved variable store 316 (e.g. as described above with reference to FIG. 2).

Although it may alternatively be possible to cache values of architectural registers in the load-store unit (which is one of the functional units 310), by predicting the value of the stack stored variables in the decode and rename stage 304 as described herein the value is predicted earlier and there is no need to load any values from a cache (instead the prediction involves a renaming operation).

Figure 4:
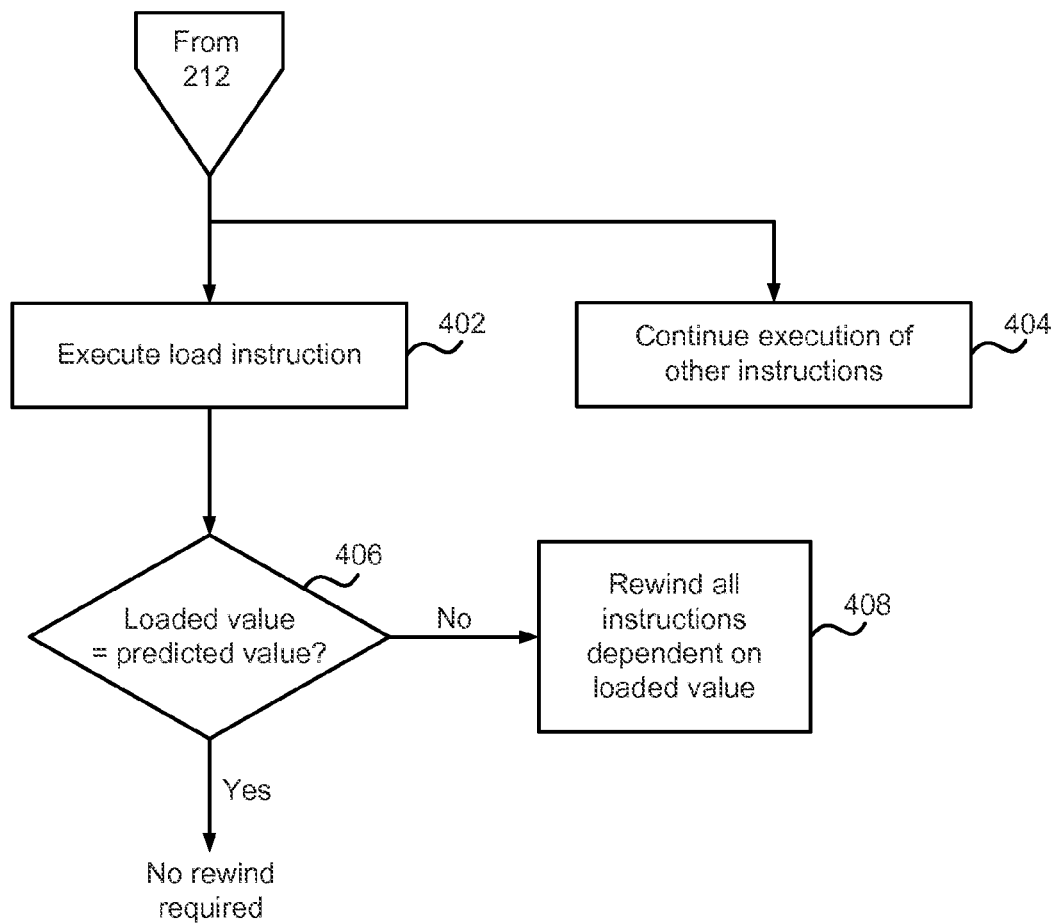
FIG. 4 shows a flow diagram of optional additional steps in the example method of predicting the value of variables saved to the stack.

As described above, in some examples, the load instruction (see in block 206) may not be performed. In other examples, however, the load instruction may still be executed in order to check that the value stored in the physical register identified in the corresponding entry of the stack saved variable store is correct, as shown in FIG. 4. In such an example, however, the load is executed (block 402) in parallel with other instructions (block 404) i.e. other instructions do not wait until the value is loaded from the stack. When the value has been loaded from the stack (in block 402), the loaded value is compared to the predicted value (block 406), i.e. the loaded value is compared to the value stored in the physical register identified in corresponding entry in the stack saved variable store. If the values match ('Yes' in block 406) then the verification is passed and no rewind is required. However, if the values do not match ('No' in block 406), all the instructions which are dependent upon the predicted value are rewound (block 408). In some examples, more instructions may be rewound than just those which are dependent upon the predicted value, e.g. all instructions which have been executed in parallel may be rewound.

The lack of a match of values (resulting in a 'No' in block 406) may occur because the physical register identified in the corresponding instruction has been overwritten in the period between the store instruction (seen in block 202) and the load instruction (seen in block 206) or because something has updated the variable value in the stack.

By performing the load in parallel (as shown in FIG. 4), there is added coherency of the predicted value with other threads or the debugger (which may wish to update register values stored in the stack). As it is unlikely that the register values stored in the stack will be changed by other threads or the debugger, the mis-prediction rate is likely to be very low.

Figure 5:
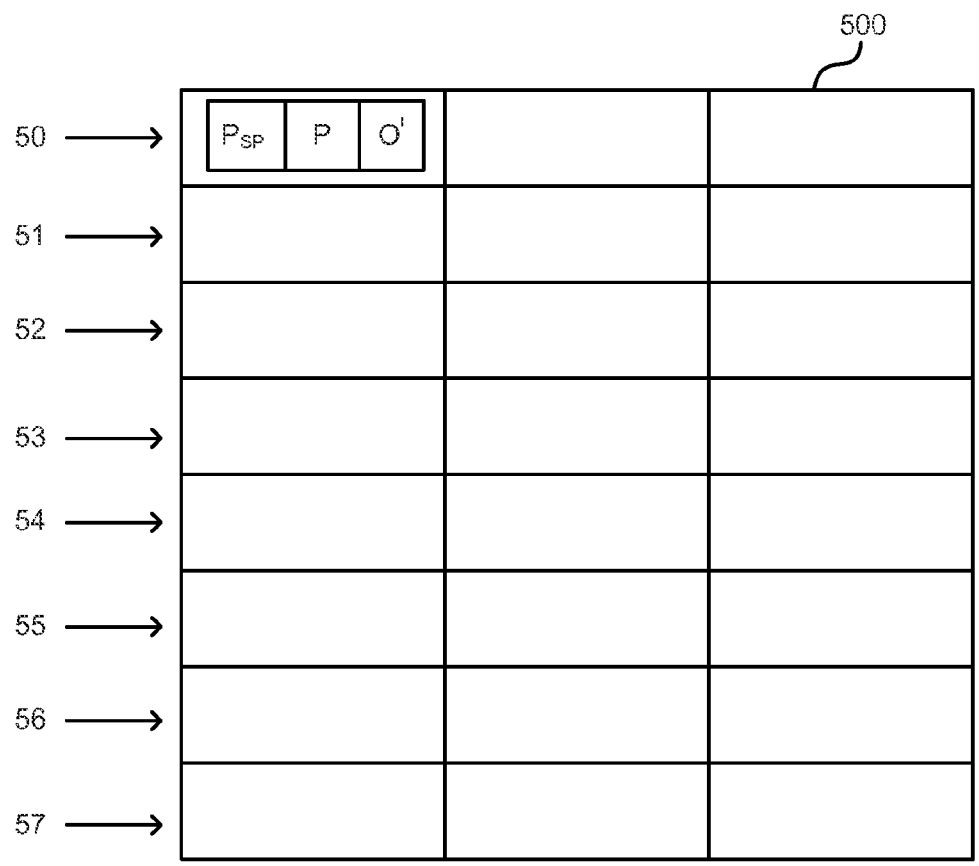
FIG. 5 shows an example of a stack saved variable store.

The stack saved variable store 316 may use any of the caching techniques which are used in memory caches, such as any level of associativity from direct mapped to fully associative. In an example, one or more of the offset bits may be used as an index into the stack saved variable store which reduces the number of entries which need to be searched to find a corresponding entry (e.g. in block 208 of FIG. 2). FIG. 5 shows an example of a stack saved value store 500 in which the 3 least-significant bits (LSBs) of the offset are used to index the entries in the store 500. In such an example there are 8 rows 50-57 which correspond to the three LSBs of the offset being 000-111 in binary (0-7 in decimal).

When a data entry is stored (e.g. in block 204 of FIG. 2) an entry is stored a row according to the three LSBs of the offset in the data entry, the data entry itself then comprises the register ID of the stack pointer ($P_{SP}$), the ID of the physical register holding the value which is being stored to the stack (P) and the remaining bits of the offset (O'). In an example where the offset comprises 5 bits, O' comprises only two bits (i.e. the two most-significant bits).

When searching for a data entry (e.g. in block 208 of FIG. 2), it is only necessary to search the row of the stack saved variable store 316 which corresponds to the three LSBs of the offset. For example, if the three LSBs of the offset are 001, then it is only necessary to look in the second row 51 for an entry which contains the correct remaining bits of the offset (i.e. the corresponding value of O') and the same stack pointer (i.e. the corresponding value of $P_{SP}$).

In various examples, the operation of the compiler may be changed in accordance with the way that the stack saved variable store is arranged and indexed. For example, where the stack saved variable store is indexed by a subset of the offset, as shown in FIG. 5, the searching is most efficient where the variables are stored at the top of the stack (i.e. resulting in small values of offset from the stack pointer), in which case the compiler can be modified such that it stores the most frequently accessed variables at or near the top of the stack.

Although the example shown in FIG. 5 indexes the stack saved variable store by the offset, or a subset of bits from the offset (where the term subset is used herein to refer to a proper subset), in other examples, other parameters may be used to index the stack saved variable store. For example, the store may be indexed by the register ID which stores the stack pointer, such that all entries which correspond to the same register ID are in the same row/column of the store. Where this is used in combination with clearing entries from the store when returning from a function call, it is only necessary to clear the row/column which corresponds to the particular register ID for the stack pointer for the function. In another example, the store may be indexed by a hash of the $P_{SP}$ and O fields or any subset/combination/function of those fields and where the hash function and/or fields may be selected to provide an index with a size which is suited to the implementation.

In various examples, following a function call the stack pointer may be restored to the value it had prior to the function call; however, as the stack pointer value may now be saved in a different physical register, any entries in the stack saved value store saved prior to the function call will no longer be found in a search for corresponding entries in the data structure (e.g. in block 208 of FIG. 2). If, however, the stack pointer is restored, following a function call, to the same physical register as prior to the function call, the previously saved data in the stack saved value store will still be usable.

This can be demonstrated by the following example in which, prior to a function call, two entries are stored in the stack saved value store (in block 204 of FIG. 2):

| P4 | P3 | 6 |
|----|----|---|
| P4 | P8 | 8 |
|    |    |   |

Both of these entries relate to the same stack pointer value, S, which is stored in physical register P4. If, in a first scenario, following a function call, the stack pointer value S is restored but instead of being saved in physical register P4 it is saved in physical register P5, a subsequent load instruction:

LD R3 [SP+#8]

will result in a search for a corresponding entry comprising the stack pointer P5 and an offset of 8. There is no such entry in the stack saved value store and so the load has to be executed (in block 214 of FIG. 4).

If in contrast, in a second scenario, following the function call, the stack pointer value S is restored to its original physical register P4 (or if, in fact, that register has not changed during the function call, the stack pointer is re-mapped to the original physical register P4), then the search for a corresponding entry will involve searching for an entry comprising the stack pointer P4 and an offset of 8. This does result in finding a corresponding entry (the second entry) and so the architectural register R3 can be mapped to register P8 (in block 212) and subsequent execution is not delayed whilst the load from memory occurs.

In various examples, low level control of the physical registers may be used to ensure that the original physical registers (which are referenced in the stack saved variable store) are not invalidated whilst they are referenced in the stack saved variable store. For example, the invalidation logic/free list may have knowledge of which registers are currently being utilized by the stack saved value store and will not invalidate them. Once the entries containing the particular register ID are flushed from the stack saved variable store, the physical registers can be invalidated/reused, etc. In some examples, the invalidation logic/free list may reuse these registers if needed and in this case the stack saved value store is notified so that it can remove the associated entries.

Figure 6:
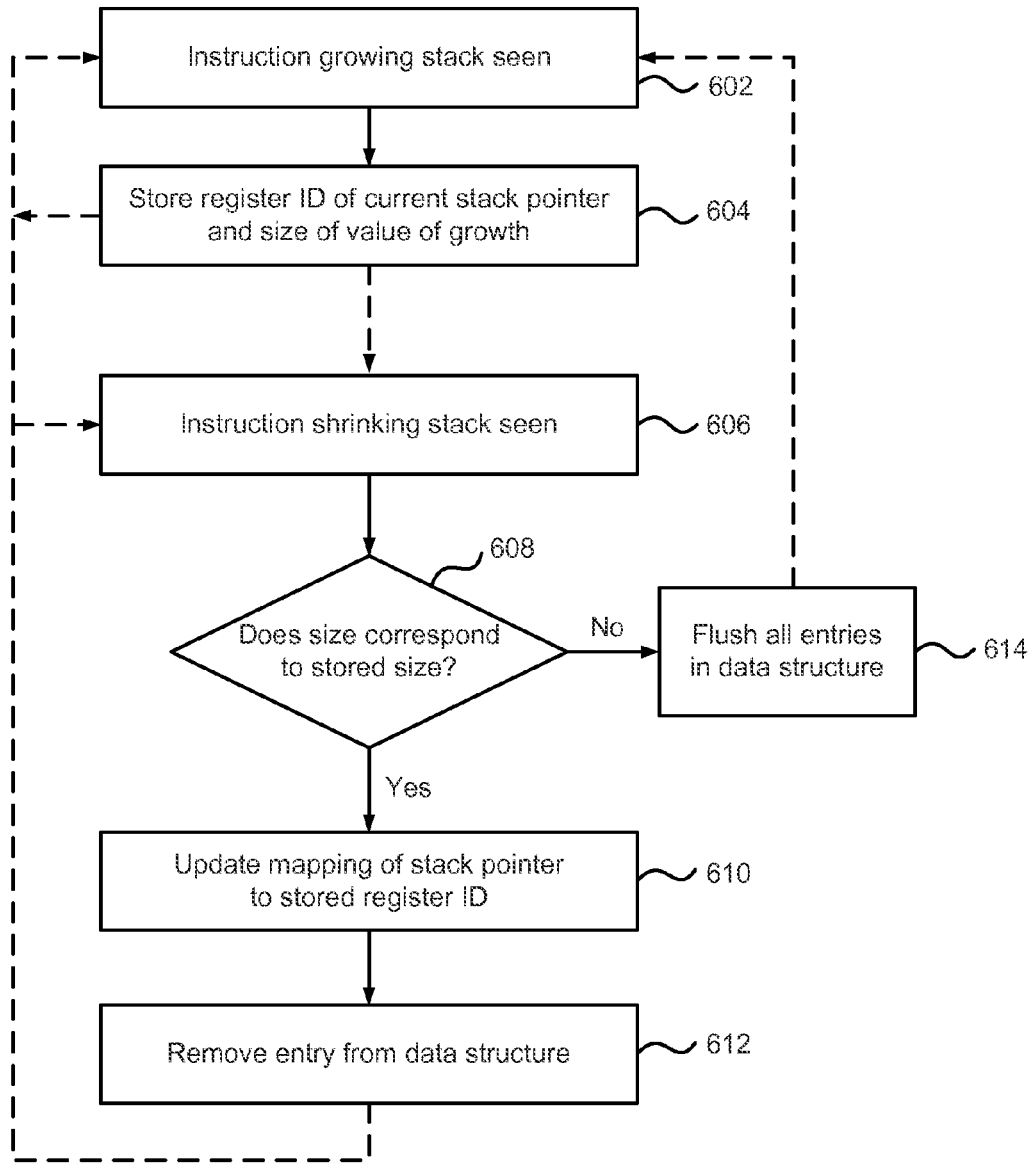
FIG. 6 is a flow diagram of an example method of stack pointer value prediction.

FIG. 6 shows a method of predicting the value of the stack pointer which results in the stack pointer being restored, following a function call, to the same physical register that it occupied prior to the function call. By using this method, the methods described above may be used even after a function call.

When an instruction growing the stack is seen (block 602), the register ID for the physical register currently holding the stack pointer value (prior to the growing of the stack) is stored along with a size value of the growth of the stack (block 604). The register ID and size value may be stored (in block 604) in a new data structure which may be arranged to hold N pairs of values (where N is a design choice). This data structure may also take the form of a stack (i.e. a LIFO or FILO data structure) with entries being removed strictly in the reverse order to which they were added to the stack and may be referred to herein as the 'prediction stack' to differentiate it from the main stack (e.g. as shown in FIG. 2) to which the instructions seen in blocks 602 and 606 of FIG. 1 refer.

In an example, the instruction growing the stack (as seen in block 602) may be the result of a function call (i.e. entering a function) and the instruction may, for example, take the form:

SUB P8 P2 16 where P8 is the ID of the new physical register assigned to the stack pointer value and where the new stack pointer value is to be stored, P2 is the ID of the physical register currently assigned to the stack pointer (and so holding the stack pointer value prior to this addition of data to the stack) and 16 is the increase in the size of the stack.

Referring back to the example stack 100 shown in FIG. 1, physical register P2 holds the stack pointer value corresponding to arrow 104 and physical register P8 is where the new value of the stack pointer corresponding to arrow 106 is stored, which enables the data (in this examples, four variables 108 each 32 bits wide) to be added to the stack 100.

If the data structure (or prediction stack) was originally empty, following the example instruction above, the contents of the data structure may be:

| P2 | 4 |
|----|---|
|    |   |
|    |   |
|    |   | where the first column contains the register ID and the second column contains the size value (in bytes). Although the data structure could store a size value of 16 (which corresponds exactly to the size value in the instruction growing the stack, as in this example data is 32 bits wide (4 bytes), the size value in instructions will always be a multiple of 4 (and hence a subset of the bits in the size value will be constant and do not need to be stored). In this example, N=4 as there is space for four entries in the data structure. It will be appreciated that this size and format of the data structure is provided by way of example only and in other examples the data structure may be arranged differently whilst still holding the same data pairs (register ID and size value).

The amount of storage (e.g. memory or flip-flops) required for the data structure depends on the value of N and the numbers of bits required to store both the register ID (e.g. 4 or 6 bits) and the size value (e.g. 4 or 6 bits). In some examples N=1, leading to a data structure which only requires a very small amount of storage. In other examples however, N>1, for example to allow for nested functions, as described below.

Subsequent to seeing the instruction growing the stack (in block 602), an instruction shrinking the stack may be seen (block 606), which may, for example, the result of returning from a function (i.e. exiting a function). The instruction may, for example, take the form:

ADD P9 P8 16 where P9 is the ID of the new physical register assigned to the stack pointer value and where the new stack pointer value is to be stored, P8 is the ID of the physical register currently assigned to the stack pointer (and so holding the stack pointer value prior to this removal of data from the stack) and 16 is the decrease in the size of the stack.

In response to detecting an instruction shrinking the stack (in block 606), the size value in this instruction is compared to the size value(s) stored in the data structure (block 608). For the purposes of the current explanation, the size value in the instruction is compared to the size value in the top entry in the data structure (i.e. the most recently added entry in the data structure).

Referring back to the example data structure shown above, it can be seen that in this example the size values do correspond ('Yes' in block 608) as the stored value 4 corresponds to a change in stack size of 16 (as, for reasons described above, the value stored in the data structure in this example is given by the change in stack size divided by 4). In response to detecting the correspondence or match ('Yes' in block 608), the register renaming table is updated to show that the new physical register assigned to the stack pointer value corresponds to the stored register ID (block 610), e.g. P2 in the example above, and the physical register identified in the instruction shrinking the stack (P9 in the example above) is not used. It is consequently not necessary to perform the calculation to compute the new value of the stack pointer (as it is already stored in the physical register identified in the data structure, e.g. P2 in the example above) which saves an ALU operation and breaks RAW hazards (which allows greater out-of-order execution). Additionally the physical register identified in the instruction shrinking the stack (e.g. P9 in the example above) can be used for another purpose (e.g. it may remain on a free register list, where such a list is maintained). The entry from the data structure containing the corresponding size value is removed from the data structure (block 612), which in the example above leaves the data structure empty.

In the example above, the instruction shrinking the stack (which was identified in block 606) comprised a size value which corresponded to the top entry in the data structure ('Yes' in block 608). If, however, the instruction shrinking the stack was, for example:

ADD P9 P8 24 then the size values do not correspond ('No' in block 608 as 24/4=6 and 6≠4). Where there is no correspondence, all the entries in the data structure are flushed (so that the data structure is empty) and the instruction shrinking the stack is executed in the normal way.

As can be seen from the description above, the comparison which is performed between the entries in the data structure and the instruction shrinking the stack ensures that a prediction is only made where it will be correct (i.e. where the size values correspond) and that no prediction of the stack pointer value is made in other situations (i.e. where the size values do not correspond).

In the example which has just been described the instruction shrinking the stack is compared to the top entry in the data structure, however in other examples described below, the comparison may also involve other entries in the data structure.

In various examples, low level control of the physical registers may be used to ensure that the original physical registers (which are referenced in the prediction stack) are not invalidated whilst they are referenced in the prediction stack. One example method would be to pass some sideband with the stack-growing instruction so that the logic later that releases/invalidates physical registers does not release/invalidate the physical register holding the stack pointer which is referenced in the prediction stack. In another example, method, the logic which maintains the prediction stack (e.g. the stack pointer value prediction module 820 shown in FIG. 8) signals which registers are in use so that the releasing/invalidating logic does not release/invalidate them. Once the entries containing the particular register ID are flushed from the prediction stack, the physical registers can be invalidated/reused, etc.

As physical registers that are referenced in the prediction stack are not invalidated, additional physical registers may be required, with the minimum number of physical registers corresponding to one more than the sum of the number of architectural registers, the maximum number of physical registers that can be referenced in the prediction stack (which is equal to N). Typically, however, a processor may have many more physical registers than this minimum.

In the example described above, the instruction shrinking the stack (seen in block 606) followed the instruction growing the stack (seen in block 602) without other data being added to and/or removed from the stack in between. In some examples, however, such as for nested functions, data may be added to the stack more than once before any of the data is removed from the stack and this can be described in another example which can be described with reference to FIG. 7.

In this example, a first instruction growing the stack is seen (in block 602):

SUB P8 P2 16

And so, as described above, the register ID storing the current stack pointer (P2) is stored in the data structure (in block 604) along with the size value (16/4=4):

| P2 | 4 |
|----|---|
|    |   |
|    |   |
|    |   |

Figure 7:
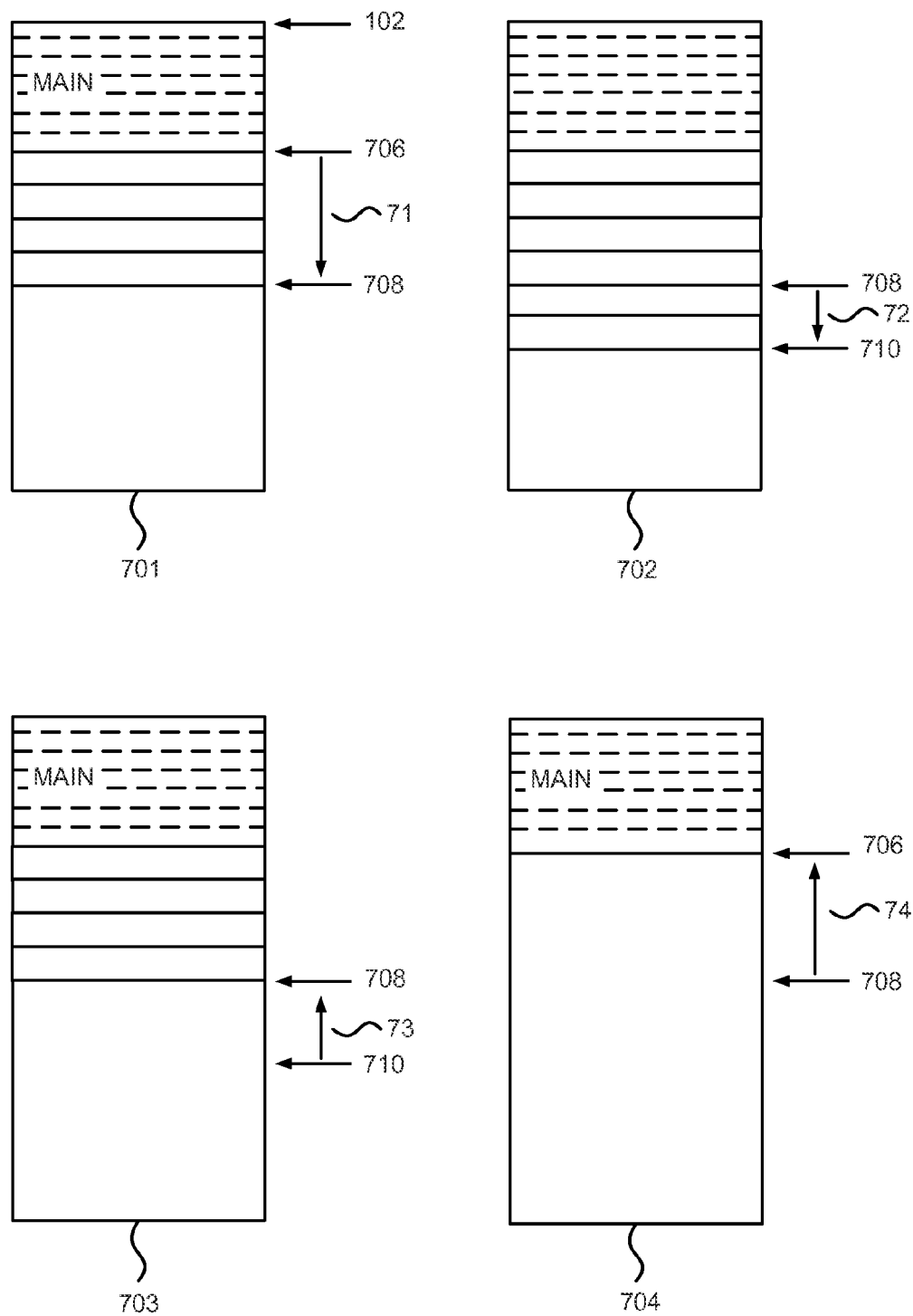
FIG. 7 shows schematic diagrams of the growth and shrinking of an example stack.

As shown in the first example stack 701 in FIG. 7, four data items are added to the stack (as indicated by arrow 71) and the stack pointer is updated from the original value corresponding to arrow 706 (as stored in physical register P2) to a new value corresponding to arrow 708, which is stored in physical register P8.

The next instruction which is seen which manipulates (i.e. grows or shrinks) the stack may, for example, be another instruction which grows the stack (as seen in block 602), as indicated by the dotted arrow from block 604 to block 602 in FIG. 6. In this example, this second instruction which grows the stack may be:

SUB P4 P8 8

And so, as described above, the register ID of the current stack pointer (P8) is stored in the data structure (in block 604) along with the size value (8/4=2):

| P2 | 4 |
|----|---|
| P8 | 2 |
|    |   |
|    |   |

This new entry is now considered the top entry in the data structure. As shown in the second example stack 702 in FIG. 7, two data items are added to the stack (as indicated by arrow 72) and the stack pointer is updated from the value corresponding to arrow 708 (as stored in physical register P8) to a new value corresponding to arrow 710, which is stored in physical register P4.

Subsequently an instruction shrinking the stack may be seen (in block 606):

ADD P3 P4 8

This size value (8) in this instruction is compared (in block 608) to the size value in the top entry in the data structure and it can be seen from this example that there is a correspondence ('Yes' in block 608 as 8/4=2 and 2=2). Consequently the mapping of the physical register storing the stack pointer is updated (in block 610) to the register ID in the top entry in the data structure (P8) and the top entry is removed from the data structure (in block 612) leaving:

| P2 | 4 |
|----|---|
|    |   |
|    |   |
|    |   |

As shown in the third example stack 703 in FIG. 7, two data items are removed from the stack (as indicated by arrow 73) and the stack pointer is updated from the value corresponding to arrow 710 as stored in physical register P4 to the value corresponding to arrow 708 which was stored earlier in physical register P8.

The next instruction which is seen which manipulates (i.e. grows or shrinks) the stack may, for example, be another instruction which shrinks the stack (as seen in block 606), as indicated by the dotted arrow from block 612 to block 606 in FIG. 6. In this example, this second instruction which shrinks the stack may be:

ADD P7 P8 16

This size value (16) in this instruction is compared (in block 608) to the size value in the top entry in the data structure and it can be seen from this example that there is a correspondence ('Yes' in block 608 as 16/4=4 and 4=4). Consequently the mapping of the physical register storing the stack pointer is updated (in block 610) to the register ID in the top entry in the data structure (P2) and the top entry is removed from the data structure (in block 612) leaving an empty data structure.

As shown in the fourth example stack 704 in FIG. 7, four data items are removed from the stack (as indicated by arrow 74) and the stack pointer is updated from the value corresponding to arrow 708 as stored in physical register P8 to the value corresponding to arrow 706 which was stored earlier in physical register P2.

This example, in which there are multiple instructions growing the stack followed by multiple instructions shrinking the stack may, for example, correspond to nested functions, for example where, in the sequence of instructions:

SUB P8 P2 16
SUB P4 P8 8
ADD P3 P4 8
ADD P7 P8 16 the outer pair of instructions correspond to a first function and the inner pair of instructions correspond to a second function which is nested inside the first function.

Where there are many nested functions within other functions, the methods described herein are still applicable; however, they may require a larger value of N (i.e. a greater depth of the data structure) so that more entries can be stored without running out of space. In the example described above, the value of N needed to equal or exceed 2 in order that the data structure did not overflow.

In examples where function calls are nested sufficiently deeply to overflow the prediction stack (e.g. N is too small for the degree of nesting used), then the oldest information in the prediction stack will be lost (and their counterparts will not be predicted); however the most recent information will survive and the predictions which are made will continue to be correct.

Figure 8:
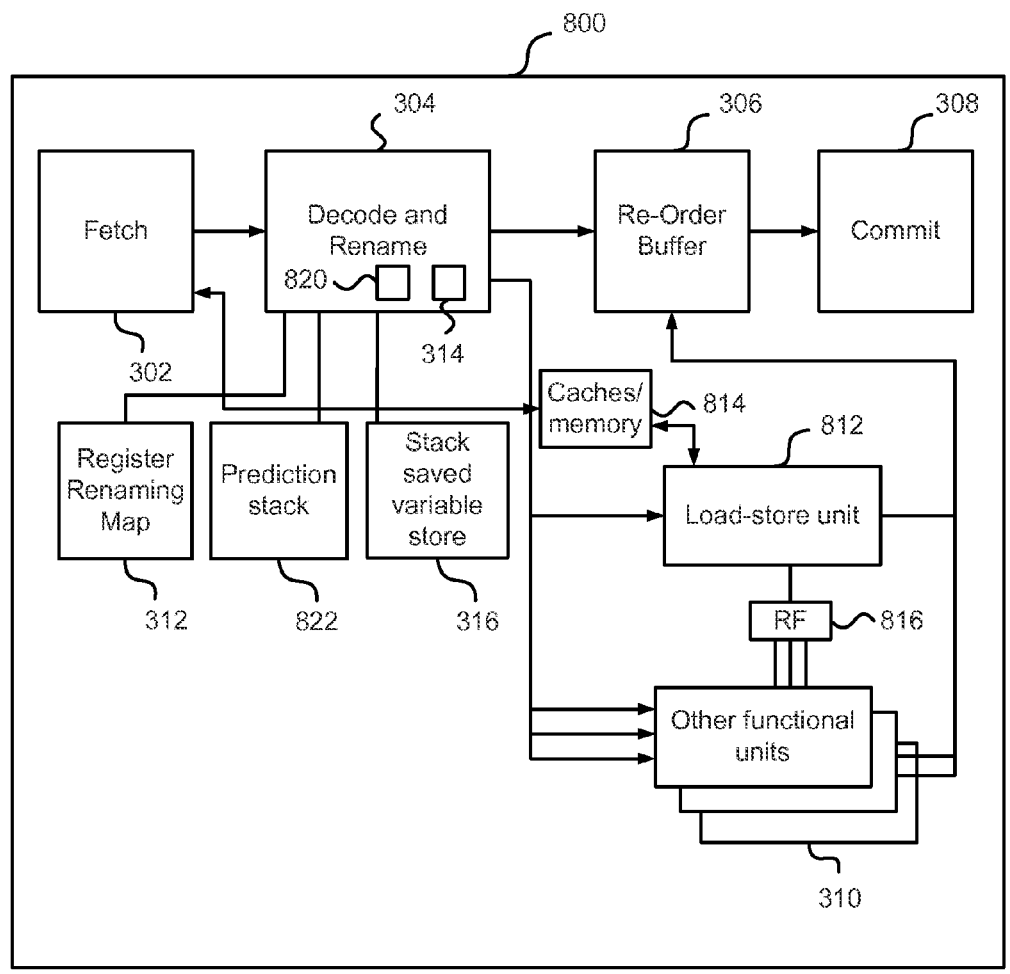
FIG. 8 shows a schematic diagram of an example processor.

FIG. 8 shows a schematic diagram of an example out-of-order processor 800 in which the methods described herein may be implemented. In this example the processor 800 is a single-threaded processor, however the methods are also applicable to multi-threaded processors (where each thread would maintain a separate stack using separate stack pointers).

The processor 800 comprises a fetch stage 302, a decode and rename stage 304, a re-order buffer 306, a commit stage 308, one or more functional units 310, 812 which each comprise one or more execution pipelines and caches/memory 814. The processor 800 further comprises a register file (RF) 816 and a register renaming map 312 which is maintained by the decode and rename stage 304 (or by a register renaming module 314 within the decode and rename stage 304).

The fetch stage 302 is configured to fetch instructions from a program (in program order) as indicated by a program counter (PC). Once an instruction is fetched it is provided to the decode and rename stage 304 which is arranged to interpret the instructions and perform register renaming. In particular, each instruction may comprise a register write operation; one or more register read operations; and/or an arithmetic or logical operation. A register write operation writes to a destination register and a register read operation reads from a source register. During register renaming each architectural register referred to in an instruction (e.g. each source and destination register) is replaced (or renamed) with a physical register.

For register write operations the architectural register (e.g. destination register) referred to is allocated an unused (or available) physical register. Any allocation may be stored in the register renaming table 312, where the register renaming table 312 is a data structure showing the mapping between each architectural register and the physical register allocated to that instruction in the program flow. For register read operations the correct physical register for a particular architectural register (e.g. source register) can be determined from an entry in the register renaming table 312 indexed by the architectural register.

The methods described above with reference to FIGS. 6 and 7 may be implemented within the decode and rename stage 304 and in an example, the decode and rename stage 304 may comprise a stack pointer value prediction module 820 which performs the method shown in FIG. 7 and described above. As described above, this module 820 (or the decode and rename stage 304) maintains a data structure referred to herein as the prediction stack 822.

After an instruction passes through the decode and rename stage 304 it is inserted into a reorder buffer 306 (ROB) and dispatched to a functional unit 310, 812 for execution. The functional unit 310, 812 that the instruction is dispatched to may be based on the type of instruction. The re-order buffer 306 is a buffer that enables the instructions to be executed out-of-order, but committed in-order. The re-order buffer 406 holds the instructions that are inserted into it in program order, but the instructions within the ROB 306 can be executed out of sequence by the functional units 310, 812. In some examples, the re-order buffer 306 can be formed as a circular buffer having a head pointing to the oldest instruction in the ROB 306, and a tail pointing to the youngest instruction in the ROB 306. Instructions are output from the re-order buffer 306 to the commit stage 308 in program order. In other words, an instruction is output from the head of the ROB 306 when that instruction has been executed, and the head is incremented to the next instruction in the ROB 306. Instructions output from the re-order buffer 306 are provided to a commit stage 308, which commits the results of the instructions to the register/memory.

Each functional unit 310, 812 is responsible for executing instructions and may be configured to execute specific types of instructions. For example a load-store unit 812 is shown in FIG. 8 and the other functional units 310 may comprise one or more of an integer unit, a floating point unit (FPU), a digital signal processing (DSP)/single instruction multiple data (SIMD) unit, or a multiply accumulate (MAC) unit. The load-store unit 812 reads data to and writes data from the L1 cache and memory beyond that. In some instances, the load-store unit may calculate addresses and it may (or may not) contain the L1 cache and perform the data/tag RAM look-ups. An integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The pipelines within the functional units may have different lengths and/or complexities. For example, a FPU pipeline is typically longer than an integer execution pipeline because it is generally performing more complicated operations.

While executing the instructions received from the decode and rename stage 304, each functional unit 310, 812 performs reads and writes to physical registers in one or more shared register files 816.

The processor 800 may also comprise functional elements other than those shown in FIG. 8. For example, the processor may further comprise a branch predictor which is configured to predict which direction the program flow will take in the case of instructions known to cause possible flow changes, such as branch instructions. Branch prediction is useful as it enables instructions to be speculatively executed by the processor 800 before the outcome of the branch instruction is known. When the branch predictor predicts the program flow accurately, this improves performance of the processor 800. However, if the branch predictor does not correctly predict the branch direction, then a misprediction occurs which needs to be corrected before the program can continue. To correct a misprediction, the speculative instructions sent to the ROB 306 are abandoned, and the fetch stage 302 starts fetching instructions from the correct program branch.

It will be appreciated that other processors may not comprise all the functional elements shown in FIG. 8 (i.e. one or more of the functional elements shown in FIG. 8 may be omitted) and may, in some examples, comprise additional functional elements not shown in FIG. 8.

In addition to the prediction stack 822 which is maintained by the decode and rename stage 304, in some examples there may be a further new data structure maintained by the load-store unit 812. This new data structure, which may be referred to herein as the stack pointer cache, stores stack pointer physical register IDs along with the actual stack pointer value (as stored in the corresponding physical register). In various examples, the stack pointer cache stores the last M stack pointer physical register IDs along with the corresponding stack pointer values and in some examples M=N.

Figure 9:
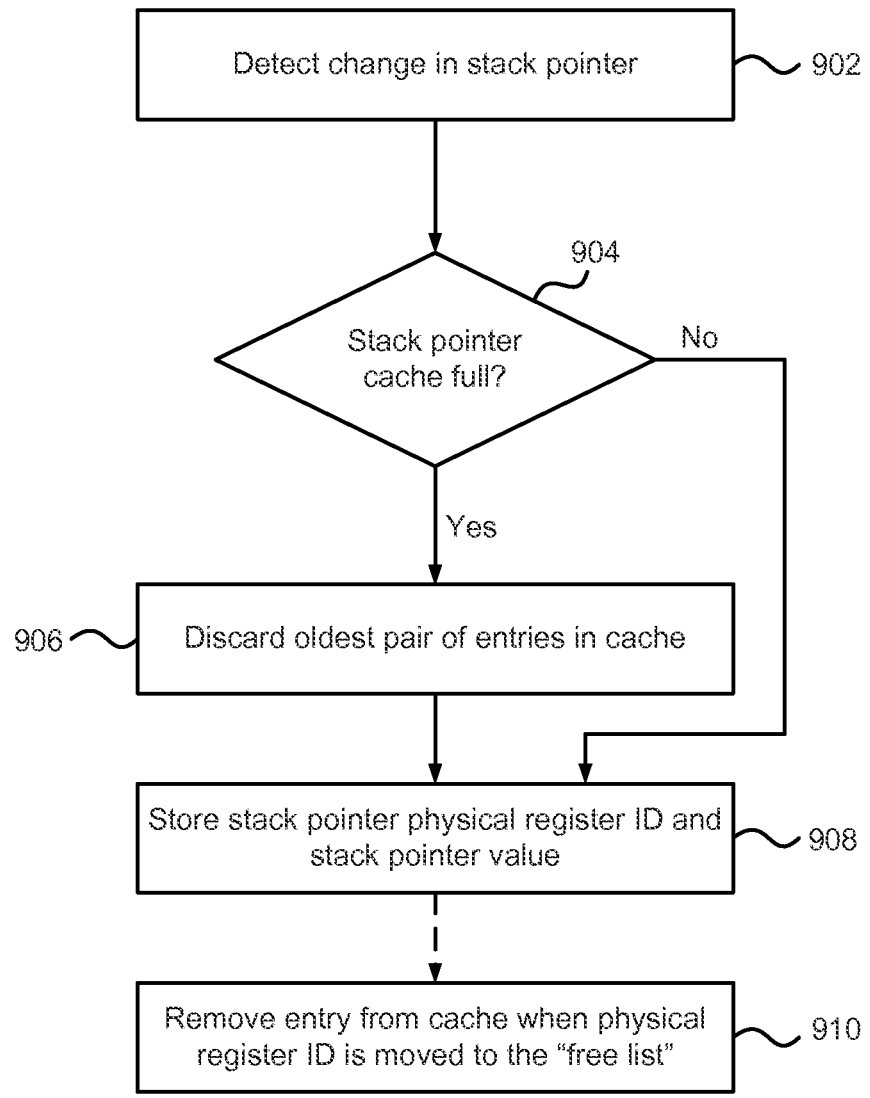
FIG. 9 is a flow diagram of an example method of stack pointer value caching implemented by a load-store unit.

FIG. 9 is a flow diagram of an example method of stack pointer value caching implemented by the load-store unit 812 which may be used in combination with the method shown in FIG. 6 which is implemented by the decode and rename stage 304 or which may be used independently of the method shown in FIG. 6. As shown in FIG. 9, when a change in stack pointer is detected (block 902), for example, by the decode and rename stage 304 which notifies the load-store unit 812, the current stack pointer physical register ID is stored along with the value of the stack pointer in the stack pointer cache (block 908). It will be appreciated that this may be implemented in a number of different ways, for example, the new physical register ID and value may be stored immediately following a change in the stack pointer or alternatively the old physical register ID and value may be stored immediately preceding a change. In various examples, storing the physical register ID may use 6 bits of memory and the value of the stack pointer may use 32 bits.

Where the size of the stack pointer cache is limited it may be arranged to store M data pairs (where the pair comprises a physical register ID and a stack pointer value). Where the size is limited, storing a new data pair may require the oldest stored pair of values to be discarded (block 906) in the event that there is no space to store the new value ('Yes' in block 904).

When a physical register ID is moved to the "free register list" (e.g. in the decode and rename stage 304), corresponding entries in the stack pointer cache are removed (block 910).

By storing the physical register IDs and values, the load-store unit already knows the value of the stack pointer when it receives an instruction to load/store using the corresponding physical register in the address and this eliminates the need to perform a register file read (which requires a register file read port). By caching the value of the stack pointer, it is possible to calculate addresses (often stack pointer plus immediate offset) without requiring a read port. This means that a limited ALU can be used for these calculation, and this frees up other functional units for other operations.

The method of FIG. 9 can be extended by adding a new column into the stack pointer cache to hold an offset value. This offset would be the offset from the stack pointer (as variables stored in memory are stored at a fixed offset from the stack pointer). In this situation, if an address for a load/store was the value of the stack pointer plus an offset (e.g. 'LD P20 [P2+8]) then the physical register and offset can be used to look up and detect if the full 32 bit address is cached in the stack pointer cache.

In the examples described above, the comparison (in block 608 of FIG. 6) compares the size value in the instruction (seen in block 606) to the top entry in the prediction stack. In other examples however, the comparison may involve more than one entry in the prediction stack. For example, if two successive instructions manipulating the stack are both adding data to the stack:

SUB P8 P2 16
SUB P9 P8 8

This results in two entries being stored in the prediction stack:

| P2 | 4 |
| P8 | 2 |
|    |   |
|    |   |

If subsequently an instruction shrinking the stack is seen (in block 606):
ADD P7 P9 24
a comparison with the top entry in the prediction stack (in block 608) would not result in a correspondence being found (6≠2); however a comparison with the top two entries would result in a correspondence (6=4+2) and so, the comparison operation (in block 608) may involve looking at more than one entry as shown in FIG. 10.

Figure 10:
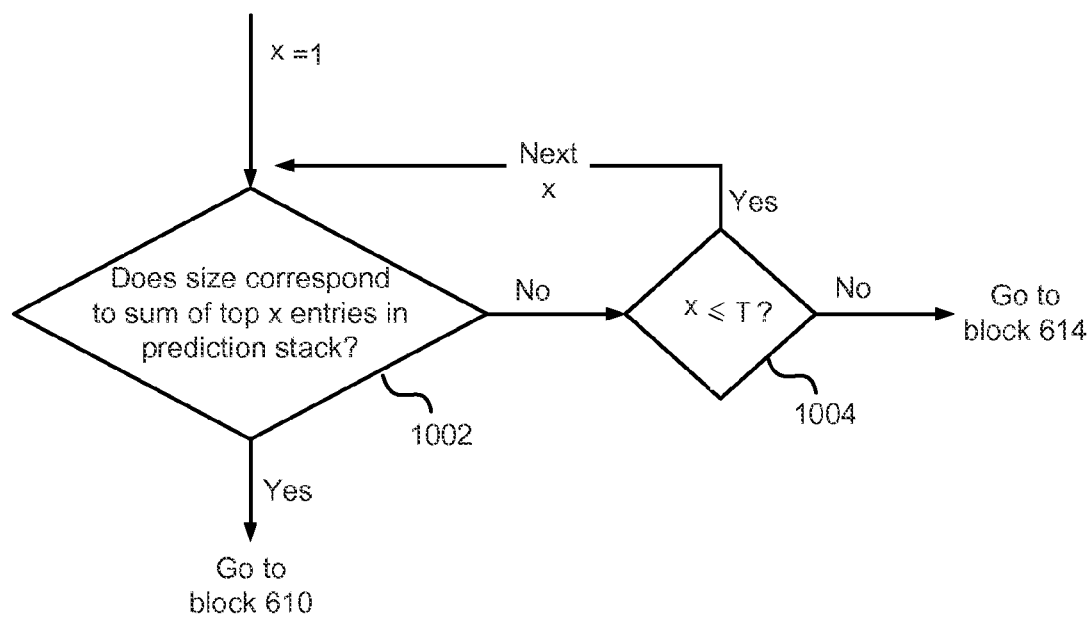
FIG. 10 is a flow diagram showing an operation from the method of FIG. 6 in more detail.

FIG. 10 is a flow diagram of an example method of implementing the comparison operation (block 608 in FIG. 6) in which there is a threshold T of the number of entries that may be used in the size comparison. If the size in the instruction shrinking the stack (seen in block 606) is only to be compared against the top entry in the prediction stack, T=1; however, if the comparison can involve more than one entry in the prediction stack, T>1. As shown in FIG. 10, the comparison starts with a variable x=1 and compares the size in the shrinking instruction (from block 606) to the top entry in the prediction stack (in a first iteration of block 1002). For T=1, the method proceeds as described above and if there is no correspondence, all entries in the prediction stack are flushed (in block 614). If however, T>1, then there are one or more further iterations of the comparison in which the size in the shrinking instruction (from block 606) is compared to the sum of sizes from increasing numbers of entries in the prediction stack (increasing by one entry in each iteration) until either there is a correspondence (when the method proceeds to block 610 in FIG. 6), the threshold is reached without a correspondence being found (when the method proceeds to block 614 in FIG. 6) or all the entries in the prediction stack have been used without a correspondence being found (when the method again proceeds to block 614 in FIG. 6).

Where multiple entries in the prediction table as used in the comparison operation (in block 608), e.g. as shown in FIG. 10, the mapping of the stack pointer is updated (in block 610) using the least recently added (i.e. the oldest) of all the entries used in the comparison operation (i.e. the oldest of the x entries which were used to achieve a correspondence) and all entries used in achieving the correspondence (i.e. all x entries which result in a 'Yes' in block 1002) are removed from the prediction stack (in block 612).

Figure 11:
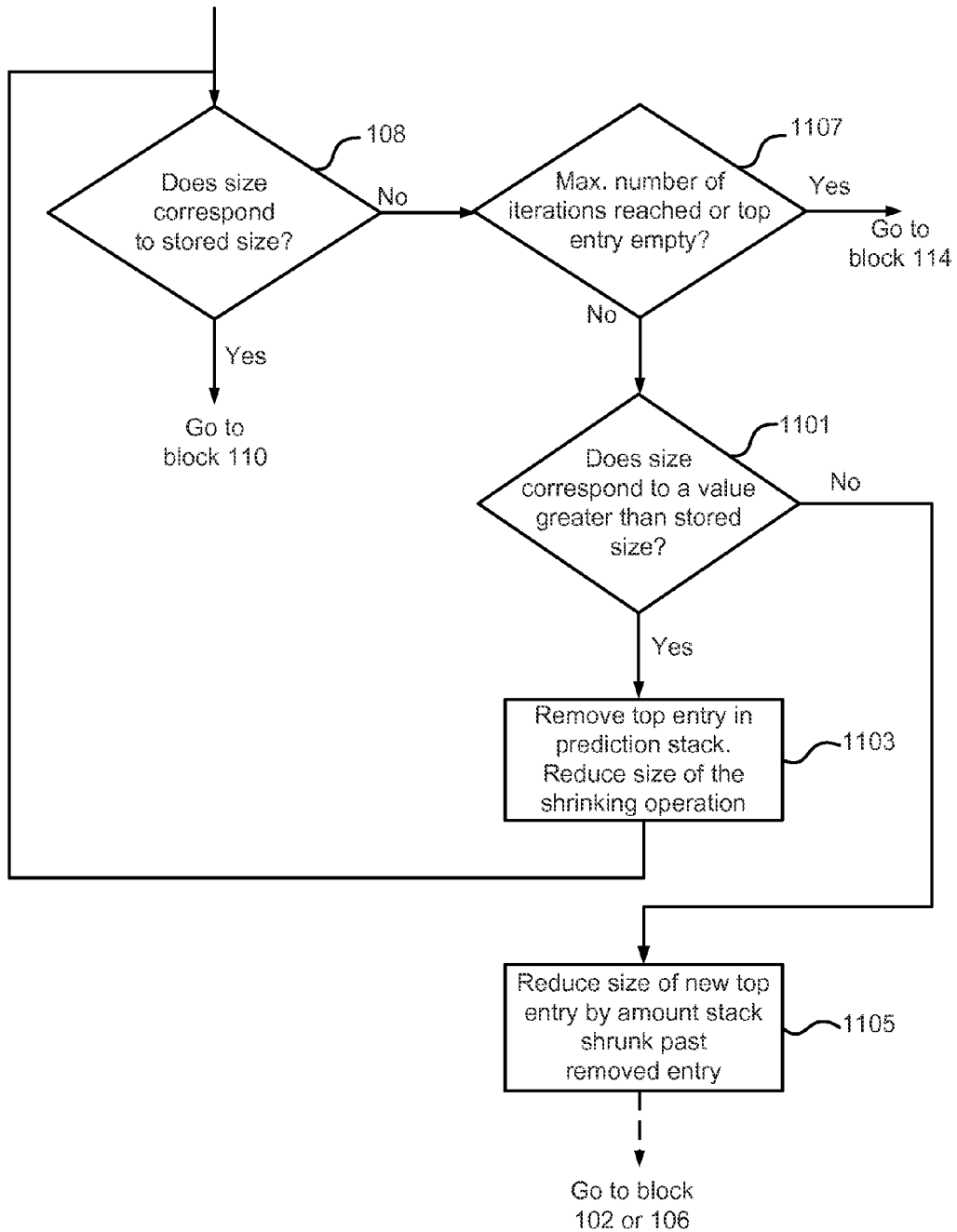
FIG. 11 is a flow diagram showing an operation from the method of FIG. 6 in more detail.

The method can also be updated to handle cases where an instruction shrinking the stack does not completely undo the operation of a set number of entries in the prediction stack, as shown in FIG. 11. FIG. 11 is an iterative method and a maximum number of iterations may be specified. For example, if two successive instructions manipulating the stack are both adding data to the stack:

SUB P8 P2 16
SUB P9 P8 8

This results in two entries being stored in the prediction stack:

| P2 | 4 |
| P8 | 2 |
|    |   |
|    |   |

If subsequently an instruction shrinking the stack is seen (in block 606):
ADD P7 P9 12
A comparison to the top entry would not result in a correspondence being found ('No' in block 608, as 12/4=3 and 3≠2) but (assuming that the maximum number of iterations has not been met, 'No' in block 1107) as the size corresponds to a value greater than the stored size ('Yes' in block 1101, as 3>2) the top entry in the prediction stack is removed (block 1103), and the size of the shrinking operation is reduced by 2 (i.e. by the size of the entry just removed) to give a shrinking size of 1 in this example.

In a second iteration of the method (assuming again that the maximum number of iterations has not been met and there are still more entries in the prediction stack, 'No' in block 1107), another comparison is performed (in block 1101) between the size of the shrinking operation (as reduced in block 1103 of the previous iteration, 1 in this example) and the stored size (4 in this example). As, in this example, the updated size of the shrinking instruction is smaller than the stored size ('No' in block 1101, as 1<4), the shrinking instruction will be allowed to execute as normal (such that in this particular example, the new stack pointer is calculated and stored in P7) and the size in the new top entry will be reduced by the size of the shrinking instruction (block 1105, e.g. a shrinking by 1 in this example as the removed entry contained the value 2 and 3-2=1) to give an entry size of 3. This results in one entry being left in the prediction stack:

| P2 | 3 |
|----|---|
|    |   |
|    |   |
|    |   |

If subsequently an instruction shrinking the stack is seen (in block 606):

ADD P6 P7 12

A comparison with the top entry would now result in a correspondence being found (as 12/4=3 and 3=3). Consequently the mapping of the physical register storing the stack pointer is updated (in block 610) to the register ID in the top entry in the data structure (P2) and the top entry is removed from the data structure (in block 612) leaving an empty data structure. The instruction shrinking the stack would not need to be executed.

Figure 12:
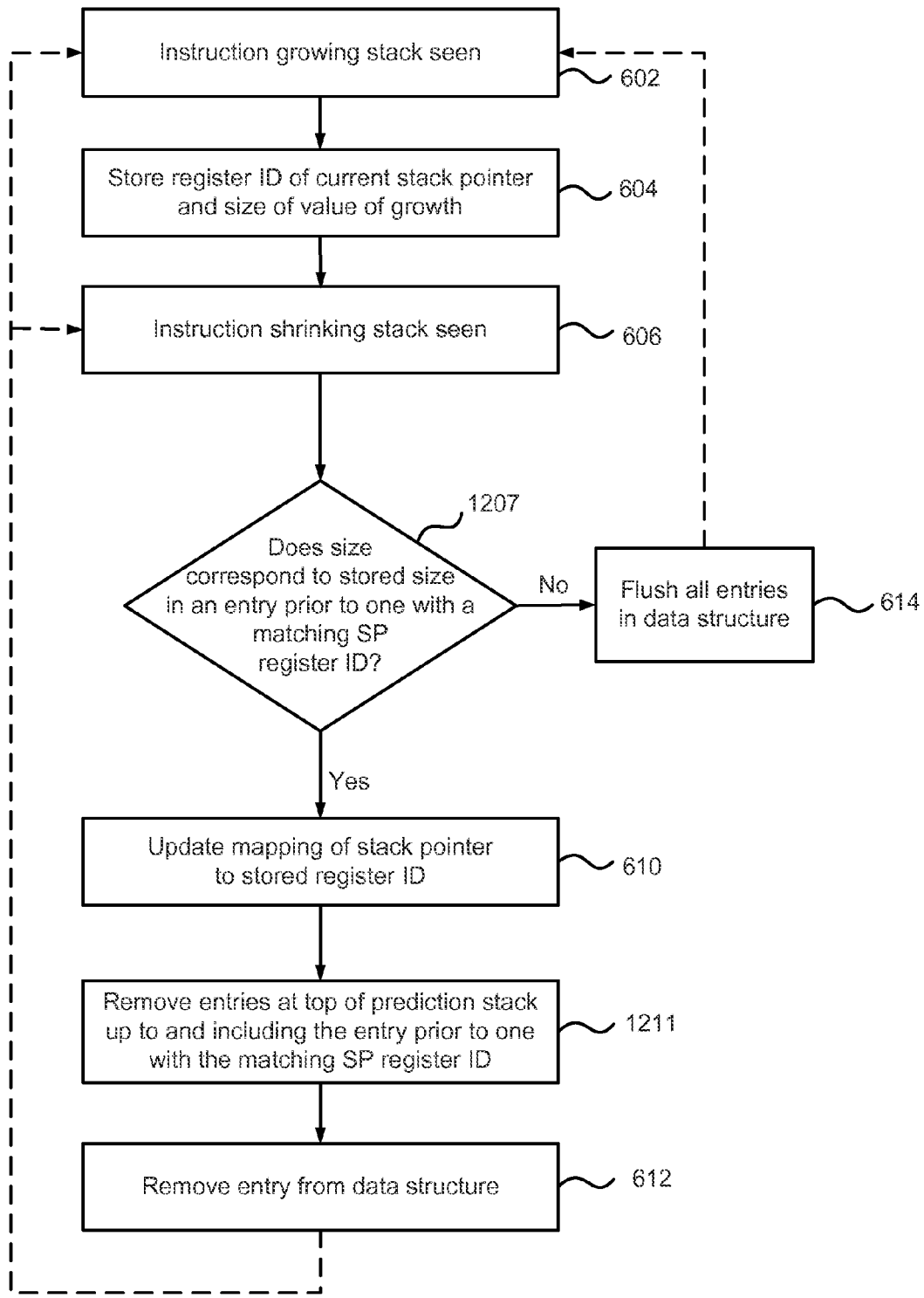
FIG. 12 is a flow diagram of another example method of stack pointer value prediction.
Figure 13:
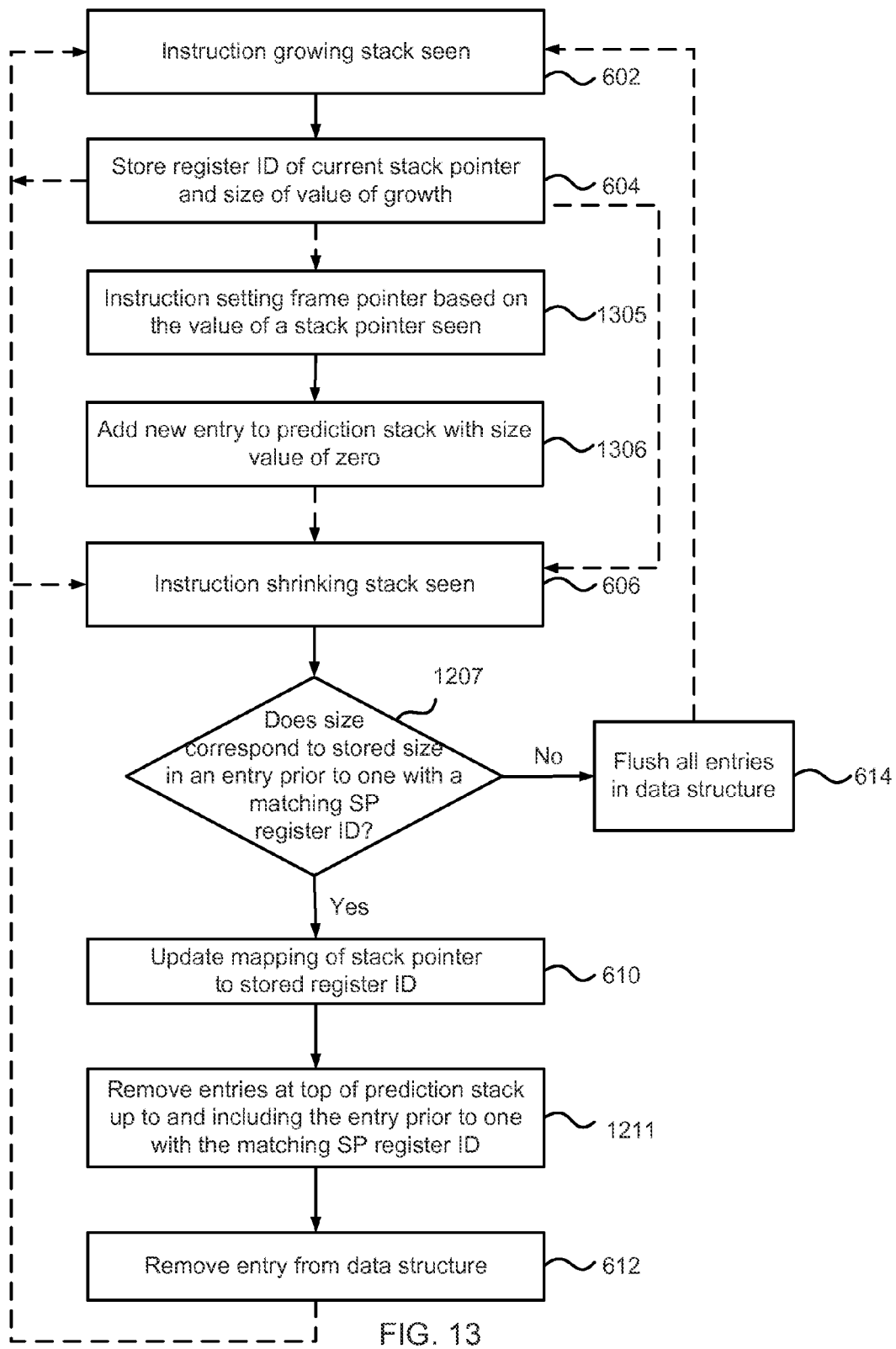
FIG. 13 is a flow diagram of a further example method of stack pointer value prediction.

In scenarios where processors dynamically allocate memory, there may be data added to the stack (resulting in a change in the stack pointer) as a result of the dynamic allocation, as well as data added to the stack as a result of a function call (as described above) and consequently the method described above with reference to FIG. 6 may be modified and two variations are shown in FIGS. 12 and 13.

In the first example variation, shown in FIG. 12, entries may still be stored in the prediction stack which are the result of the dynamic allocation of memory (rather than a function call) are flagged in the prediction stack (in block 604). An example of such an instruction (e.g. as seen in block 602) would be SUB SP SP R5, rather than SUB SP SP 8.

In an example, if there are two instructions adding data to the stack which are the result of function calls, followed by one or more instructions adding data to the stack which are the result of dynamic allocation of memory, the prediction stack may look like:

| P2 | 4 |
|----|---|
| P8 | 4 |
| P9 | 0 |
|    |   |
|    |   |

In this example, only the first in a sequence of instructions which add data to the stack and are the result of dynamic allocation of memory are stored in the prediction stack (in block 604).

If an instruction shrinking the stack is subsequently seen (in block 606), such as:

ADD P7 P9 16 the comparison of sizes (in block 1207) looks to an entry prior to one which has the same stack pointer register ID as identified in the instruction (e.g. P9 in this example). In this example, there is a correspondence ('Yes' in block 1207, as the entry prior to the one comprising P9 is P8, 4, 16/4=4 and 4=4) and consequently, the mapping of the stack pointer is updated to register ID P8 (in block 610). All the entries at the top of the prediction stack up to and including the entry prior to one which has the same stack pointer register ID as identified in the instruction (e.g. P8, 4 in the example above) are then removed (block 1211). In the example above, the prediction stack would then only contain a single entry:

| P2 | 4 |
|----|---|
|    |   |
|    |   |
|    |   |
|    |   |

The second example variation, shown in FIG. 13, involves the detection of instructions relating to a frame pointer (which indicates that memory allocation is being performed dynamically). Where memory is allocated dynamically, both a stack pointer and a frame pointer may be used. Unlike a stack pointer which changes in value when data is added to or removed from the stack (and so may change while the function is running in situations where memory is allocated dynamically), the frame pointer may be used to point to a fixed position in the stack (for the period while a function is running, if the stack pointer is required for dynamic memory allocation). This fixed position may, for example, be the position the stack pointer would be pointing at if no dynamic allocation was used within the function (i.e. the memory location after the last statically allocated section of memory).

As shown in FIG. 13, in this second example variation, entries are added to the prediction stack in the same way as described above with reference to FIG. 6 (in blocks 602 and 604); however, if an instruction setting a frame pointer based on the value of a stack pointer is seen (block 1305), e.g.:

MOV FP SP which could update the rename map entry for FP with the physical register assigned to SP (P9 in this example), then a new entry in the prediction stack is added (block 1306). In an example, the prediction stack prior to the detection of the instruction relating to a frame pointer may comprise:

| P2 | 4 |
|----|---|
| P8 | 4 |
|    |   |
|    |   |
|    |   |

Following detection of the instruction setting a frame pointer based on the value of a stack pointer (in block 1305) the prediction stack may comprise:

| P2 | 4 |
|----|---|
| P8 | 4 |
| P9 | 0 |
|    |   |
|    |   | where the top entry in the prediction stack comprises the current physical register assigned to the stack pointer (P9 in this example) and a size value of zero (as the stack has not grown). The instruction MOV FP SP may be considered to be an indication that there will be a dynamic allocation soon (rather than trying to detect the dynamic allocation itself).

The method then proceeds in a similar manner to that described with reference to FIG. 12. For example, if there are a number of subsequent instructions that grow the stack, the prediction stack may comprise:

| P2  | 4 |
|-----|---|
| P8  | 4 |
| P9  | 0 |
| P10 | 4 |
| P11 | 4 |

The latest entries in the prediction stack may be from static allocations from within a nested function. These may be removed in the normal way leaving the following prediction stack:

| P2 | 4 |
|----|---|
| P8 | 4 |
| P9 | 0 |
|    |   |
|    |   |

At this point if a shrinking instruction is seen shrinking the stack from the value in P9 by 4, e.g.:
ADD P12 P9, 16

Then the stack pointer can be remapped to P8 (as P9 was the SP after doing SUB P9 P8 16), the instruction may be dropped, and the latest 2 entries may be removed from the prediction stack (in block 1211) to leave just one entry.

It will be appreciated that although the description of FIGS. 12-13 only refers to comparison with single entries in the prediction stack, these variations may be combined with the variations described with reference to FIGS. 10-11, e.g. such that the size in an instruction shrinking the stack (as seen in block 606) may be compared with more than one entry in the prediction stack (in block 608 or 1207).

In a further variation of FIGS. 12 and 13, flags may be used (in each entry in the prediction stack) to indicate whether instructions were added as a result of a function calls. In such an example, block 1211 is modified such that all flagged entries at the top of the prediction stack are removed.

Figure 14:
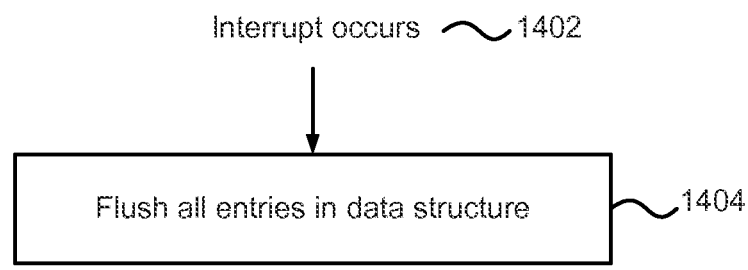
FIG. 14 is a flow diagram showing a method implemented when an interrupt occurs.

FIG. 14 is a flow diagram of a method which is used when an interrupt is detected (block 1402) and this method may be used in combination with any of the methods described previously. When an interrupt occurs, the stack pointer is stored into memory and then restored on exit of the interrupt. As the interrupt may have manipulated the value of the stack pointer, the entries stored in the prediction stack may no longer be valid and so the prediction stack is flushed to remove all entries (block 1404). This can be extended to include the detection of any situation where the stack pointer value is loaded from memory.

Figure 15:
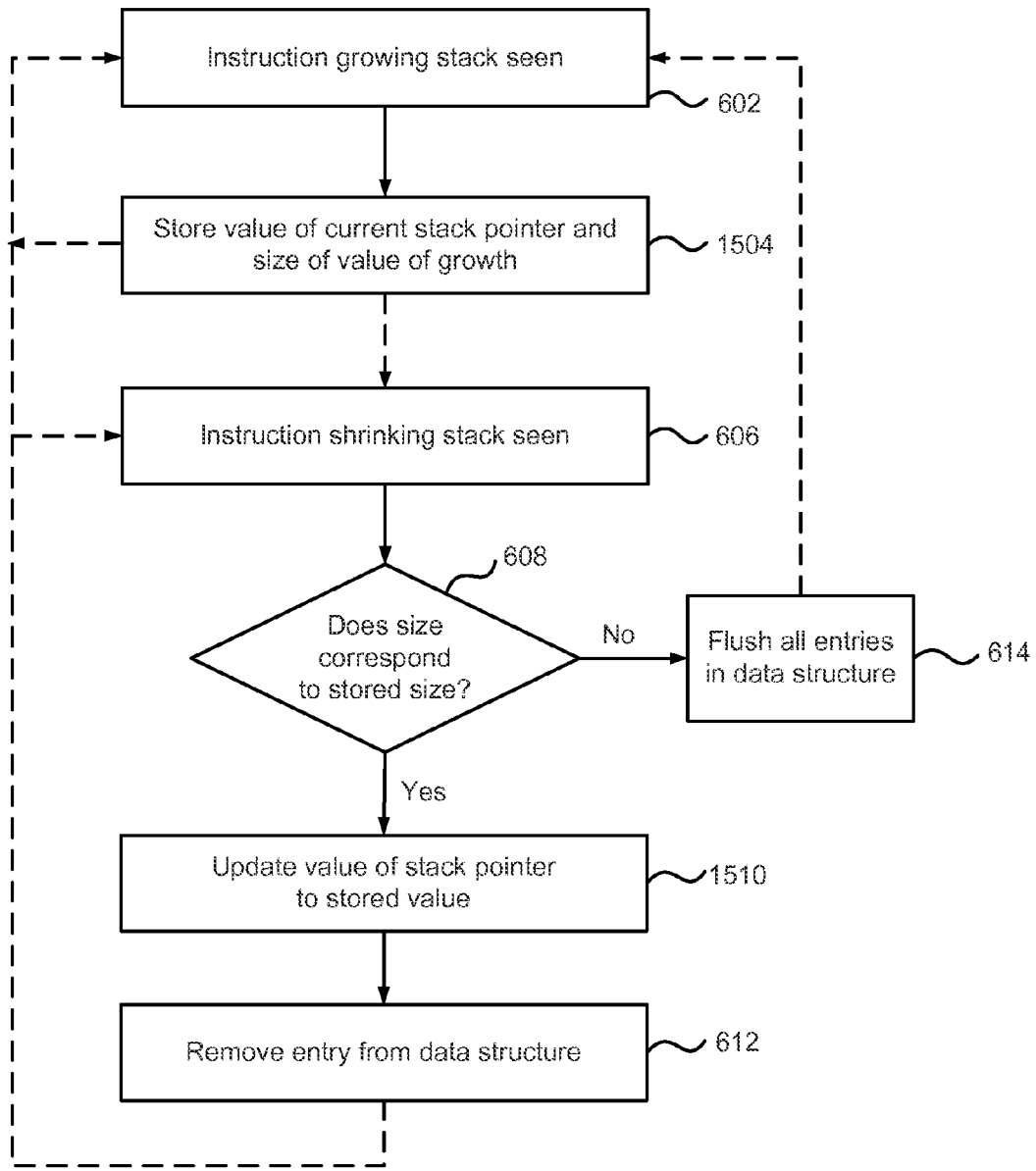
FIG. 15 is a flow diagram of a yet further example method of stack pointer value prediction.

The methods are described above in relation to a processor which uses register renaming. The methods are also applicable where register renaming is not used; however in such applications the prediction stack stores the current stack pointer value (prior to the growing of the stack) along with a size value of the growth of the stack (in block 1504), as shown in FIG. 15. This is less efficient than using the register ID because the stack pointer requires more storage (e.g. it may be a 32-bit value). The method then proceeds as shown in FIG. 6 and described above, except that instead of updating the mapping of the stack pointer (in block 610) if there is a correspondence between the size in the shrinking instruction (seen in block 606) and a stored entry (or entries) in the prediction stack ('Yes' in block 608), the stack pointer is itself updated to the stored value (block 1510). It will be appreciated that the variations described above with reference to FIG. 6 (e.g. as shown in FIGS. 10-13) are also applicable to the method shown in FIG. 15.

In the examples above the data structure which stores the stack pointer register ID and size values of the growth of the stack (the prediction stack) is described as a FILO. It will be appreciated, however, that it may alternatively be implemented using a cache structure.

Although the methods described above relate to prediction of the stack pointer value, the techniques described may also be used to detect any instruction which is predicted to be reversible and if the reverse of this instruction is seen subsequently, the old physical register can be used. In such examples, the data structure used may use a cache structure rather than a FILO to store data on all functions which might be reversible. As data (e.g. physical register ID and constant value, although there may be other fields depending on the particular operation) is stored for each operation which might be reversible, rather than only instructions which are subsequently reversed, it is necessary to look at stored data which is not the most recently stored entry in the data structure.

The methods described herein may be used with programming languages with calling conventions similar to C (which covers most languages) that use a stack in memory for storage within that part of the program scope. The methods may be modified for use with other languages.

By combining the methods of predicting values saved to the stack and methods of predicting the stack pointer, the data saved in the stack saved value store may be useful in more situations (i.e. there may be more situations where corresponding entries in the stack saved value store may be found) and so there may be an increased number of occasions when the delay associated with loading a value from memory can be avoided.

An alternative to using the method described above with reference to FIGS. 6-16, a stack structure may be stored (instead of the prediction stack described above) which saves only the offsets by which the stack pointer is grown (instead of the SP physical register ID and the SP value) and this may be referred to as the 'offset stack'. Where the offset stack is used, the stack saved value prediction store is also modified such that instead of storing the ID of the physical register storing the stack pointer ($P_{SP}$), an ID representing the top entry of the offset stack is stored. This reduces the storage in both the offset stack (compared to the prediction stack) and the stack saved variable store, and enables the methods described above with reference to FIGS. 1-5 to be used following a function call, but does not allow prediction of stack pointer values.

Referring back to FIG. 2, in such an implementation, the data entry stored in the data structure (in block 204) comprises the current ID of the offset stack ($ID_{OFF}$) along with the register ID of the physical register storing the value of the variable before it was stored to the stack (P) and the offset to the current stack pointer at which the variable is stored (O). When an instruction loading a variable from the stack with reference to the stack pointer is subsequently seen (in block 206), the stack saved variable store is searched (in block 208) to look for a corresponding entry and in this example, the corresponding entry is determined by comparing the offset, O, and the current ID of the offset stack, $ID_{OFF}$. Where a corresponding entry is found ('Yes' in block 210), the architectural register referenced in the load instruction (seen in block 206) is mapped to the register ID given by P in the corresponding entry.

The methods described above may also be modified such that they can be used for more general loads/stores (i.e. loads/stores which are not directly referenced to the stack pointer). When a pointer for a data item is passed into a function, it will usually be the value of the stack pointer (from a previous function) with an added offset. This can then be used inside the function (for the store, or for the load).

In such a variation of the methods described above, information on which physical registers are at particular known offsets from a stack pointer physical register are stored (e.g. in a step equivalent to block 204 of FIG. 2) and this information can then be used to detect a match (e.g. in a step equivalent to block 210 in FIG. 2). For example:
  ST P1 [P2+#8] (P2=SP)
  ADD P3 P2 8 (create pointer to data)
  # function call
  LD P4 [P3+#0] (search table for P2,8 as it is known that P3=P2+8)
  Or when coming out of a function:
  ADD P3 P2 8 (create pointer to data)
  # function call
  ST P1 [P3+#0] (add to table as P2,8 as we know P3=P2+8)
  # function return
  LD P4 [P2+#8] (search table for P2,8)

In both cases a match will be found using this variation, even though they would not have matched using the earlier method described above.

Although the methods are described above in relation to a single processor which is not multi-threaded, the methods are also applicable to multi-threaded and/or multi-core processors as they do not share stack space and so the methods described above may operate independently for each thread/core.

The methods described above all rely on the use of register renaming. A method described above involves storing a data entry (e.g. in block 204) in which the elements $P_{SP}$, P and O are represented and then searching these data entries by $P_{SP}$ and O to find P. In a variation of this (described above), the data entry may represent elements $ID_{OFF}$, P and O and then these data entries may be searched by the offset ID ($ID_{OFF}$) and O to find P. However, the methods may be modified in order to be used without register renaming. In particular, instead of storing the physical register, P, in block 204 of FIG. 2, the value of the register, V, is stored instead and instead of storing the register ID corresponding to the stack pointer ($P_{SP}$), the offset stack described above may be used and the value of $ID_{OFF}$ stored or the value of the stack pointer $V_{SP}$ may be stored. When searching for a corresponding entry (e.g. in block 208 of FIG. 2), the data entries are searched by either the value of the stack pointer ($V_{SP}$) and O or the offset ID ($ID_{OFF}$) and O to find V (rather than P) and this value V is used to update a register storing the variable (e.g. in a block corresponding to block 212 of FIG. 2).

It can be seen that whether register renaming is used or not, the method updates the effective value of an architectural register using the information stored in the corresponding entry in the stack saved variable store. Where register renaming is used, the effective value of an architectural register is updated by updating the register renaming map (in block 212) and where register renaming is not used, the effective value of an architectural register is updated by writing the value (from the corresponding entry in the stack saved variable store) to a register.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), microprocessors, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of predicting, with respect to a stack in a processor, the stack having a stack pointer, pointer values of variables stored in the stack, the method comprising:
   in response to detection of a first instruction storing a variable to the stack with reference to the stack pointer, storing in a data structure a data entry comprising a unique ID for the stack pointer, a parameter representing a value of the variable before it was stored to the stack and an offset to the stack pointer at which the variable is stored;
   subsequent to detection of the first instruction and in response to detection of a second instruction loading a variable from the stack with reference to the stack pointer, searching by at least one processor the data structure for an entry corresponding to the detected second instruction; and
   in response to finding a corresponding entry in the data structure, updating an effective value of an architectural register referenced in the detected second instruction using information stored in the corresponding entry.

2. A method according to claim 1, wherein a corresponding entry comprises an offset and a unique ID for the stack pointer which corresponds to an offset and stack pointer information in the detected second instruction.

3. A method according to claim 1, further comprising:
   in response to failing to find a corresponding entry in the data structure, executing the detected second instruction.

4. A method according to claim 1, wherein the unique ID for the stack pointer is an identifier that it updated each time the stack grows or shrinks.

5. A method according to claim 4, wherein the parameter representing a value of the variable before it was stored to the stack comprises the value of the variable before it was stored to the stack.

6. A method according to claim 1, wherein the unique ID for the stack pointer is a register ID of a physical register storing a current value of the stack pointer.

7. A method according to claim 6, wherein the parameter representing a value of the variable before it was stored to the stack comprises a register ID of a physical register storing a value of the variable before it was stored to the stack.

8. A method according to claim 6, wherein a corresponding entry comprises an offset which corresponds to the offset in the detected second instruction and further comprises a register ID of a physical register storing the value of the stack pointer which is the same as the physical register storing the value of the stack pointer in the detected second instruction.

9. A method according to claim 6, wherein updating an effective value of an architectural register referenced in the detected second instruction using information stored in the corresponding entry comprises:
updating a register renaming map to map an architectural register referenced in the detected second instruction to the ID of the physical register storing a value of the variable in the corresponding entry.

10. A method according to claim 6, further comprising, after updating the register renaming map to map an architectural register referenced in the detected second instruction to the ID of the physical register storing a value of the variable in the corresponding entry:
executing the detected second instruction to load the variable from the stack in parallel with execution of other instructions;
comparing the loaded value and the value of the variable stored in the physical register identified in the corresponding entry; and
in response to detecting a mismatch between the loaded value and the stored value, rewinding all instructions dependent upon the loaded value and which were executed in parallel with the detected second instruction.

11. A method according to claim 6, further comprising:
removing all entries corresponding to a function from the data structure on a return from the function.

12. A method according to claim 6, wherein storing the data entry in the data structure comprises storing the data entry in the data structure indexed by:
one or more bits from the offset;
a subset of the bits from the offset;
the register ID of a physical register storing the current value of the stack pointer; or
an index value generated using a hash function to combine one or more bits from each of the offset and the register ID of a physical register storing the current value of the stack pointer.

13. A method according to claim 1, the method further comprising:
in response to detection of an instruction growing the stack, storing, in a data structure, a data entry comprising a size value corresponding to an amount by which the instruction grows the stack and at least one of:
a register ID of a physical register storing a value of the stack pointer prior to the instruction growing the stack; and
the value of the stack pointer prior to the instruction growing the stack; and
subsequent to detection of the instruction growing the stack and in response to detection of an instruction shrinking the stack, comparing a size value corresponding to an amount by which the instruction shrinks the stack to one or more stored size values in the data structure;
in response to detecting a correspondence between the size value corresponding to an amount by which the instruction shrinks the stack and one or more stored size values, updating the stack pointer based on data entries comprising the one or more stored size values used in the comparison and removing from the data structure the data entries comprising the one or more stored size values used in the comparison; and
in response to failing to detect a correspondence between the size value corresponding to an amount by which the instruction shrinks the stack and one or more stored size values, removing all entries from the data structure.

14. A method according to claim 13, wherein each stored data entry comprises:
a size value corresponding to an amount by which an instruction grows the stack and a register ID of a physical register storing a value of the stack pointer prior to the instruction growing the stack; or
a size value corresponding to an amount by which an instruction grows the stack and a value of the stack pointer prior to the instruction growing the stack.

15. A method according to claim 13, wherein comparing a size value corresponding to an amount by which the instruction shrinks the stack to one or more stored size values in the data structure comprises one of:
a) comparing a size value corresponding to an amount by which the instruction shrinks the stack to a size value in a single most recent entry the data structure;
b) comparing a size value corresponding to an amount by which the instruction shrinks the stack to a stored size value in an entry in the data structure prior to an entry including a register ID of the current stack pointer;
c) comparing a size value corresponding to an amount by which the instruction shrinks the stack to a size value in x most recent entries the data structure, where x=1; and in response to detecting no correspondence between the size value corresponding to an amount by which the instruction shrinks the stack and the size value in x most recent entries the data structure, repeating the comparison with a value of x increased by 1 until a correspondence is detected or x exceeds a predefined threshold; and
d) (i) comparing a size value corresponding to an amount by which the instruction shrinks the stack to a size value in a single most recent entry the data structure;
(ii) in response to detecting no correspondence between the size value corresponding to an amount by which the instruction shrinks the stack and the size value in the most recent entry the data structure, determining whether a maximum number of iterations has been reached or a top entry in the data structure is empty;
(iii) in response to determining that a maximum number of iterations has not been reached and a top entry in the data structure is not empty, determining whether the size value corresponding to an amount by which the instruction shrinks the stack is greater than the size value in the most recent entry in the data structure;
(iv) in response to determining that the size value corresponding to an amount by which the instruction shrinks the stack is greater than the size value in the most recent entry in the data structure, removing the most recent entry from the data structure and reducing the size value corresponding to an amount by which the instruction shrinks the stack by the size value in the removed entry from the data structure and returning to block (i) in a further iteration; and
(v) in response to determining that the size value corresponding to an amount by which the instruction shrinks the stack is not greater than the size value in the most recent entry in the data structure, reducing a size value in a next most recent entry in the data structure by a difference between the amount by which the instruction shrinks the stack and the size value in the removed most recent entry.

16. A method according to claim 13, wherein comparing a size value corresponding to an amount by which the instruction shrinks the stack to one or more stored size values in the data structure comprises:

comparing a size value corresponding to an amount by which the instruction shrinks the stack to a stored size value in an entry in the data structure prior to an entry including a register ID of the current stack pointer, and wherein the method further comprises:

in response to detecting an instruction setting a frame pointer based on the value of a stack pointer, adding a new data entry to the data structure with a size value of zero.

17. A method according to claim 13, wherein comparing a size value corresponding to an amount by which the instruction shrinks the stack to one or more stored size values in the data structure comprises:

comparing a size value corresponding to an amount by which the instruction shrinks the stack to a stored size value in an entry in the data structure prior to an entry including a register ID of the current stack pointer, and wherein the method further comprises:

removing from the data structure all most recent data entries up to an including the entry including the register ID of the current stack pointer.

18. A method according to claim 13, further comprising, in a load-store unit in the processor:

detecting a change in a stack pointer; and in response to detecting a change in the stack pointer, storing a register ID of a physical register storing a value of the stack pointer prior to the change and the value of the stack pointer prior to the change.

19. A method according to claim 13, further comprising in response to detecting an interrupt, removing any entries from the data structure.

20. An apparatus comprising:

hardware logic arranged to predict, with respect to a stack in a processor, the stack having a stack pointer, pointer values of variables stored in the stack; and memory arranged to store a stack saved variable store, wherein the hardware logic is arranged to:

store in the stack saved variable store, in response to detection of a first instruction storing a variable to the stack with reference to the stack pointer, a data entry comprising a unique ID for the stack pointer, a parameter representing a value of the variable before it was stored to the stack and an offset to the stack pointer at which the variable is stored;

search the stack saved variable store, subsequent to detection of the first instruction and in response to detection of a second instruction loading a variable from the stack with reference to the stack pointer, for an entry corresponding to the detected second instruction; and update, in response to finding a corresponding entry in the stack saved variable store, an effective value of an architectural register referenced in the detected second instruction using information stored in the corresponding entry in the stack saved variable store.

* * * * *